US011897116B2

(12) United States Patent
Mittelstadt et al.

(10) Patent No.: US 11,897,116 B2
(45) Date of Patent: Feb. 13, 2024

(54) ENGINE STAND

(71) Applicant: Oshkosh Defense, LLC, Oshkosh, WI (US)

(72) Inventors: Andrew Mittelstadt, Oshkosh, WI (US); David A. Schmitz, Oshkosh, WI (US); Joseph Stone, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 95 days.

(21) Appl. No.: 16/172,404

(22) Filed: Oct. 26, 2018

(65) Prior Publication Data

US 2019/0126460 A1 May 2, 2019

Related U.S. Application Data

(60) Provisional application No. 62/578,067, filed on Oct. 27, 2017.

(51) Int. Cl.

*B25H 1/00* (2006.01)
*B25H 1/16* (2006.01)
*B65D 19/44* (2006.01)

(52) U.S. Cl.

CPC ............. *B25H 1/0007* (2013.01); *B25H 1/00* (2013.01); *B25H 1/16* (2013.01); *B65D 19/44* (2013.01)

(58) Field of Classification Search

CPC ....... B25H 1/00; B25H 1/0007; F01D 25/285; B65D 2587/6877; B65D 2587/6875; B65D 19/00; B65D 19/44

See application file for complete search history.

(56) References Cited

U.S. PATENT DOCUMENTS

| | | | | | |
|---|---|---|---|---|---|
| 2,885,165 | A * | 5/1959 | Smolen | F16M 5/00 269/296 |
| 4,116,424 | A | 9/1978 | Varga et al. | |
| 4,177,978 | A * | 12/1979 | Warsaw | B66F 13/00 254/134 |
| 4,239,196 | A * | 12/1980 | Hanger | B25H 1/0007 269/17 |
| 4,412,615 | A | 11/1983 | Forshee | |
| 4,440,265 | A * | 4/1984 | Spagnoli | B66F 7/04 182/129 |
| 4,804,162 | A | 2/1989 | Rice | |
| 4,846,451 | A * | 7/1989 | Squier | B25H 1/0007 269/17 |
| 4,848,717 | A * | 7/1989 | Bevill | B25H 1/0007 248/670 |

(Continued)

*Primary Examiner* — Tyrone V Hall, Jr.
*Assistant Examiner* — Makena S Markman
(74) *Attorney, Agent, or Firm* — Foley & Lardner LLP

(57) ABSTRACT

An engine stand including a cradle assembly configured to support an engine assembly and a dolly configured to support the cradle assembly. The cradle assembly includes an upper frame assembly including a first frame member and a second frame member each fixedly coupled to a third frame member, a protrusion coupled to and extending substantially vertically upward from the first frame member, and a rest coupled to the second frame member, the rest having an engagement surface shaped to correspond to a shape of an exterior surface of the engine assembly. At least one of the first frame member, the second frame member, and the third frame member define an aperture configured to receive a fork from a lift device.

16 Claims, 22 Drawing Sheets

(56) References Cited

U.S. PATENT DOCUMENTS

| | | | | |
|---|---|---|---|---|
| 5,599,031 | A * | 2/1997 | Hodges | B62B 5/0083 280/35 |
| 5,662,315 | A * | 9/1997 | Neiss | B25H 1/0007 254/134 |
| 6,170,141 | B1 * | 1/2001 | Rossway | B64F 5/50 206/319 |
| 6,318,699 | B1 | 11/2001 | Williams | |
| 6,397,965 | B1 * | 6/2002 | McFarlane | B60K 1/04 180/298 |
| 6,866,246 | B2 * | 3/2005 | Collier | B66F 3/36 254/2 B |
| 7,963,542 | B2 * | 6/2011 | Doll | F16M 3/00 280/405.1 |
| 8,302,738 | B2 | 11/2012 | Sorensen | |
| 8,876,448 | B1 * | 11/2014 | Hess | B60P 7/06 410/46 |
| 9,249,733 | B2 | 2/2016 | Hallam et al. | |
| 9,321,170 | B2 * | 4/2016 | Avis | B25H 5/00 |
| 9,752,505 | B2 * | 9/2017 | Roh | F02C 7/20 |
| 10,040,579 | B1 * | 8/2018 | Henderson | B65D 19/44 |
| 10,196,199 | B2 * | 2/2019 | Demianovich | B60P 3/035 |
| 10,612,420 | B2 * | 4/2020 | Sharrow | F01D 25/162 |
| 2008/0105638 | A1 * | 5/2008 | Crawford | B66C 1/62 212/180 |
| 2009/0064685 | A1 * | 3/2009 | Busekros | F01D 25/04 60/797 |
| 2009/0266275 | A1 * | 10/2009 | Feeney | B64F 5/50 206/319 |
| 2012/0110816 | A1 * | 5/2012 | Groves | F01D 25/285 254/7 C |
| 2015/0136935 | A1 * | 5/2015 | Hallam | F01D 25/285 248/554 |
| 2017/0023171 | A1 * | 1/2017 | Khan | F16M 3/00 |
| 2019/0322391 | A1 * | 10/2019 | Lamadon | B64F 5/50 |

* cited by examiner

ENGINE STAND

CROSS REFERENCE TO RELATED APPLICATION

This application claims the benefit of U.S. Provisional Application No. 62/578,067, filed Oct. 27, 2017, which is incorporated herein by reference in its entirety.

BACKGROUND

Conventional vehicles include engines that provide mechanical energy to tractive elements in contact with a support surface, which in turn propel the vehicle. Such engines are typically at least partially enclosed in an engine compartment of the vehicle, which protects the engine from outside elements and debris. Consequently, some engine maintenance procedures (e.g., procedures requiring disassembly of the engine) can be difficult to perform with the engine enclosed in the engine compartment. To facilitate access during such maintenance procedures, the engine is removed (e.g., dropped, lifted, etc.) from the engine compartment and attached to an engine stand. The engine stand then supports the engine while the maintenance procedure is performed remotely from the rest of the vehicle. However, conventional engine stands can be difficult and time consuming to attach to the engine. By way of example, some conventional engine stands require multiple fasteners to be connected to the engine before the engine stand can support the engine. These engine stands further require that the engine is held stationary by another lifting device while the fasteners are aligned and tightened. Accordingly, there is a need for an engine stand that can quickly and easily be attached to an engine to facilitate support and manipulation of the engine outside of a vehicle.

SUMMARY

At least one embodiment relates to an engine stand including a cradle assembly configured to support an engine assembly and a dolly configured to support the cradle assembly. The cradle assembly includes an upper frame assembly including a first frame member and a second frame member each fixedly coupled to a third frame member, a protrusion coupled to and extending substantially vertically upward from the first frame member, and a rest coupled to the second frame member, the rest having an engagement surface shaped to correspond to a shape of an exterior surface of the engine assembly. At least one of the first frame member, the second frame member, and the third frame member define an aperture configured to receive a fork from a lift device. The protrusion is configured to be received by an aperture defined by the engine assembly. The engagement surface is configured to contact the engine assembly when the cradle assembly supports the engine assembly. At least a portion of the engagement surface is angled relative to a horizontal plane. The dolly includes a lower frame assembly, multiple receiving channels coupled to the lower frame assembly, and multiple wheels rotatably coupled to the lower frame assembly and configured to support the lower frame assembly. The receiving channels each open upward. Each of the receiving channels is configured to receive at least one of the first frame member, the second frame member, and the third frame member.

Another embodiment relates to an engine stand including a cradle assembly configured to support an engine assembly and a dolly configured to support the cradle assembly. The cradle assembly includes an upper frame assembly comprising a first frame member and a second frame member each fixedly coupled to a third frame member, an aperture extending substantially vertically upward from the first frame member, and a rest coupled to the second frame member, the rest having an engagement surface shaped to correspond to a shape of an exterior surface of the engine assembly. The aperture is configured to receive a fastener configured to be received by an aperture defined by the engine assembly. The engagement surface is configured to contact the engine assembly when the cradle assembly supports the engine assembly. At least a portion of the engagement surface is angled relative to a horizontal plane. The dolly includes a lower frame assembly and multiple wheels rotatably coupled to the lower frame assembly and configured to support the lower frame assembly.

Another embodiment relates to an engine stand including a frame assembly, a support assembly coupled to the frame assembly, a jack assembly coupled to the frame assembly, and a plurality of wheels rotatably coupled to the frame assembly and configured to support the frame assembly. The support assembly is configured to support an engine assembly, and includes a tray configured to receive a front end of the engine assembly and at least one receiver configured to receive a rear end of the engine assembly. The jack assembly is configured to support a transmission of the engine assembly and includes a base element fixedly coupled to the frame assembly, a rotating element rotatably and translatably coupled to the base, and an interface element coupled to the rotating element such that the interface element moves vertically with the rotating element. The rotating element is configured to transfer a rotational movement of the rotating element to a corresponding vertical movement of the rotating element. The plurality of wheels is configured to support the frame assembly.

This summary is illustrative only and is not intended to be in any way limiting. The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, an engine stand is configured to support an engine assembly (e.g., during maintenance of the engine assembly). The engine stand includes a dolly configured to move freely across the ground. The dolly includes multiple u-shaped receiving channels that open upwards and a set of wheels configured to facilitate movement across the ground. The engine stand further includes a cradle assembly including a pair of longitudinally-extending frame members fixedly coupled to a pair of laterally-extending frame members. The laterally-extending members are configured to be received by the receiving channels to selectively couple the cradle assembly to the dolly. The first laterally-extending frame member is coupled to a stud that extends substantially vertically upwards to be received by an aperture defined by a component of the engine assembly. The second laterally-extending frame member is coupled to one or more engine rests that each define an engagement surface that is shaped to correspond to the shape of an exterior surface of the engine assembly. The longitudinally-extending frame members each define an aperture configured to receive a fork from a fork lift.

In operation, the engine assembly is lowered onto the cradle assembly or the cradle assembly is moved up into contact with the engine assembly. The engagement surfaces of the engine rests engage the exterior surface of the engine such that the engine rests support the engine assembly. The stud extends into the corresponding aperture of the engine assembly. Together, the stud and the engine rests prevent relative horizontal movement between the engine assembly and the cradle assembly. The cradle assembly is received by the receiving channels, coupling the cradle assembly to the dolly. With dolly supporting both the engine assembly and the cradle assembly, the engine stand may be freely moved across the ground (e.g., to a position remove from a vehicle). The cradle assembly and the engine assembly may be removed from the dolly by lifting the cradle assembly vertically upward (e.g., using a forklift having forks received by the apertures of the longitudinally-extending frame members. The cradle assembly may then be set directly on the ground or onto another device (e.g., jack stands).

Figure 1:
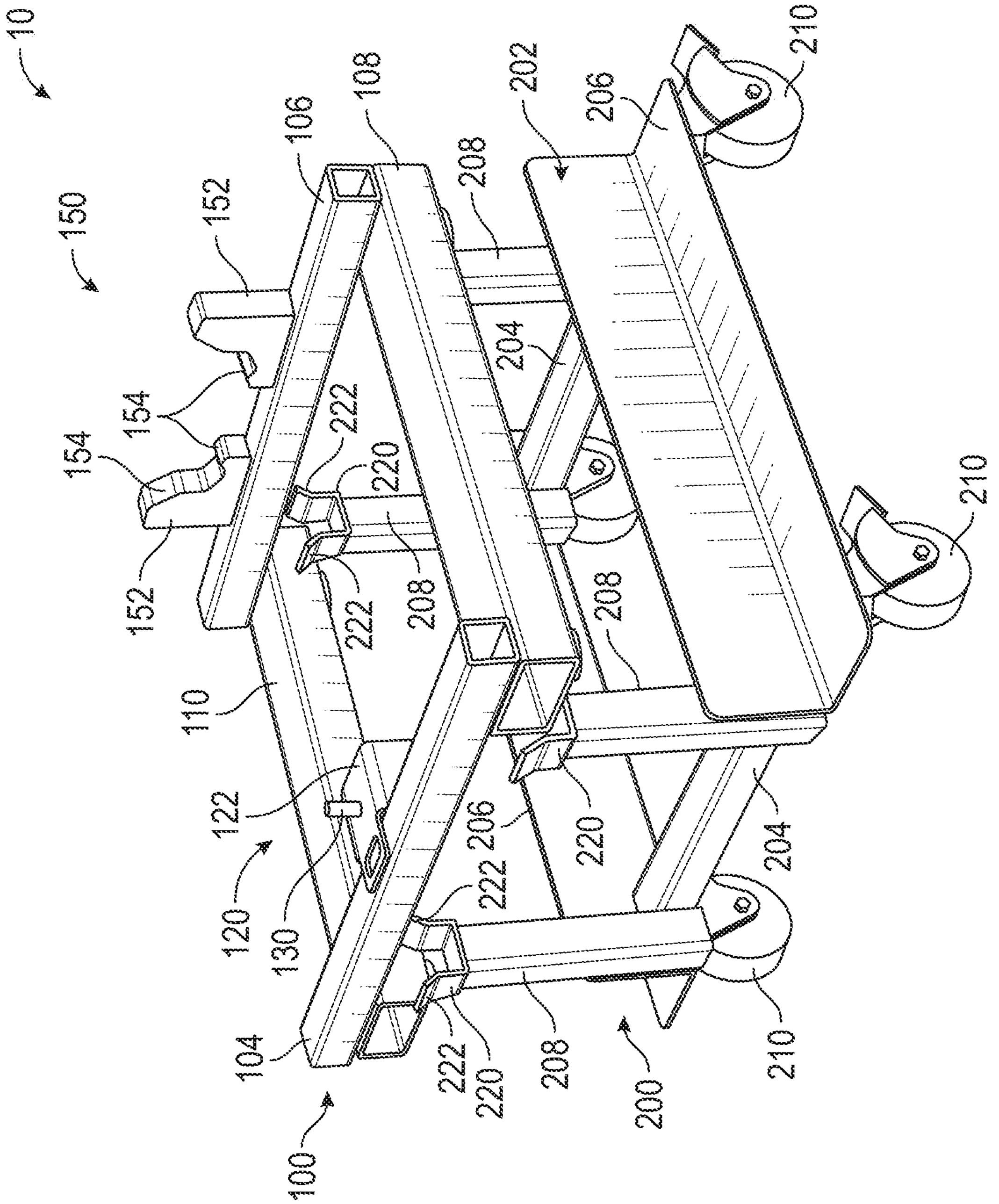
FIG. 1 is a perspective view of an engine stand, according to an exemplary embodiment.
Figure 2:
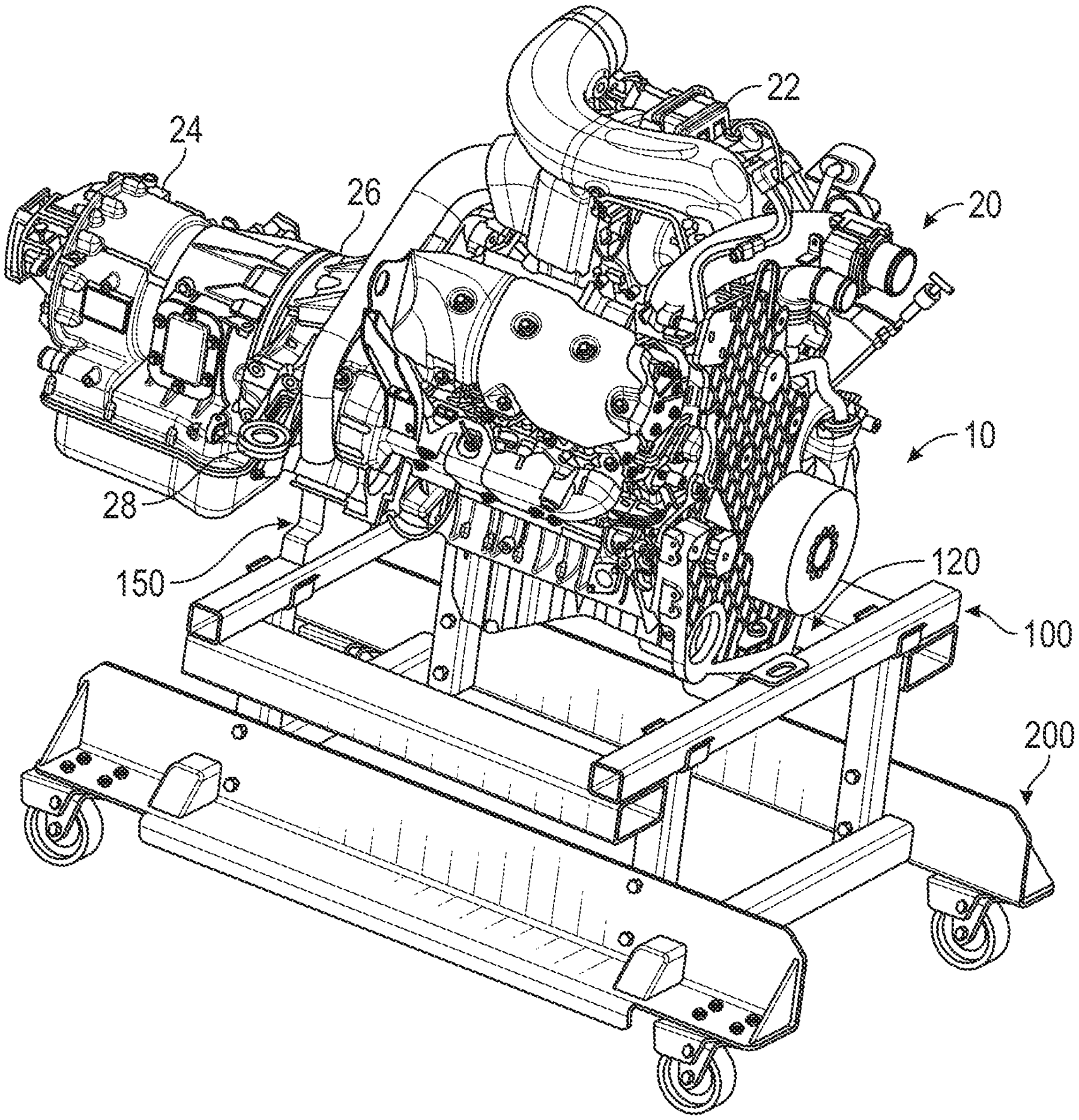
FIGS. 2-6 are various views of the engine stand of FIG. 1 supporting an engine assembly.

According to the exemplary embodiment shown in FIGS. 1 and 2, an engine stand assembly or engine cradle assembly is shown as engine stand 10. The engine stand 10 is configured to support an engine or powertrain, shown as engine assembly 20. The engine stand 10 includes a cradle assembly 100 configured to selectively couple to and support the engine assembly 20. The cradle assembly 100 facilitates support and manipulation of the engine assembly 20. The cradle assembly 100 is selectively coupled to and supported by a dolly assembly, shown as dolly 200. The cradle assembly 100 may be used in combination with the dolly 200 to raise the engine assembly 20 and to facilitate movement across the ground. Alternatively, the cradle assembly 100 may be used without the dolly 200. By way of example, the cradle assembly 100 may be carried by a forklift. By way of another example, the cradle assembly 100 may rest upon a support structure, such as one or more jack stands. By way of yet another example, the cradle assembly 100 may be placed directly on the ground.

Figure 7:
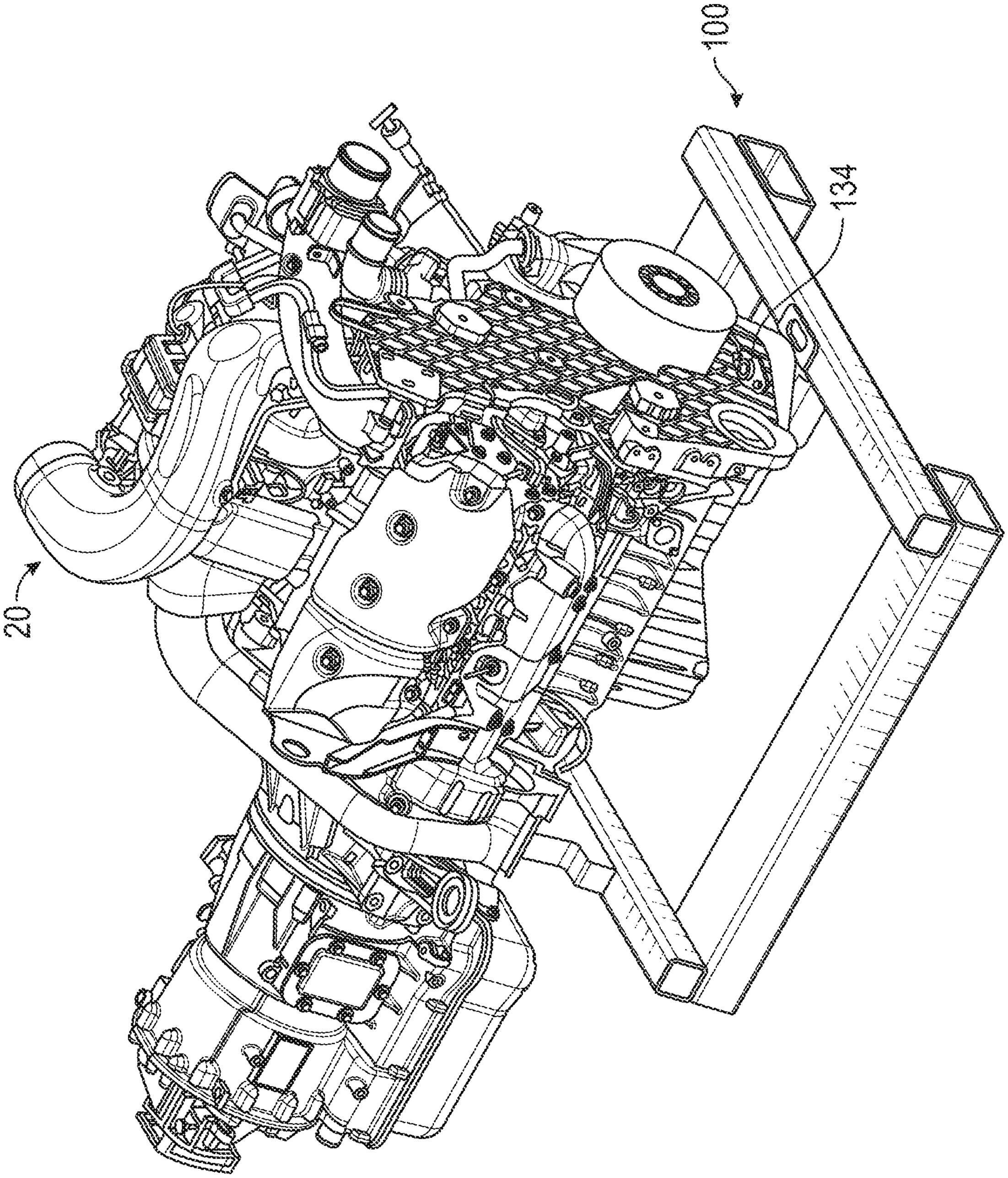
FIGS. 7 and 8 are perspective views of a cradle assembly of the engine stand of FIG. 1 supporting an engine assembly, according to an exemplary embodiment.
Figure 8:
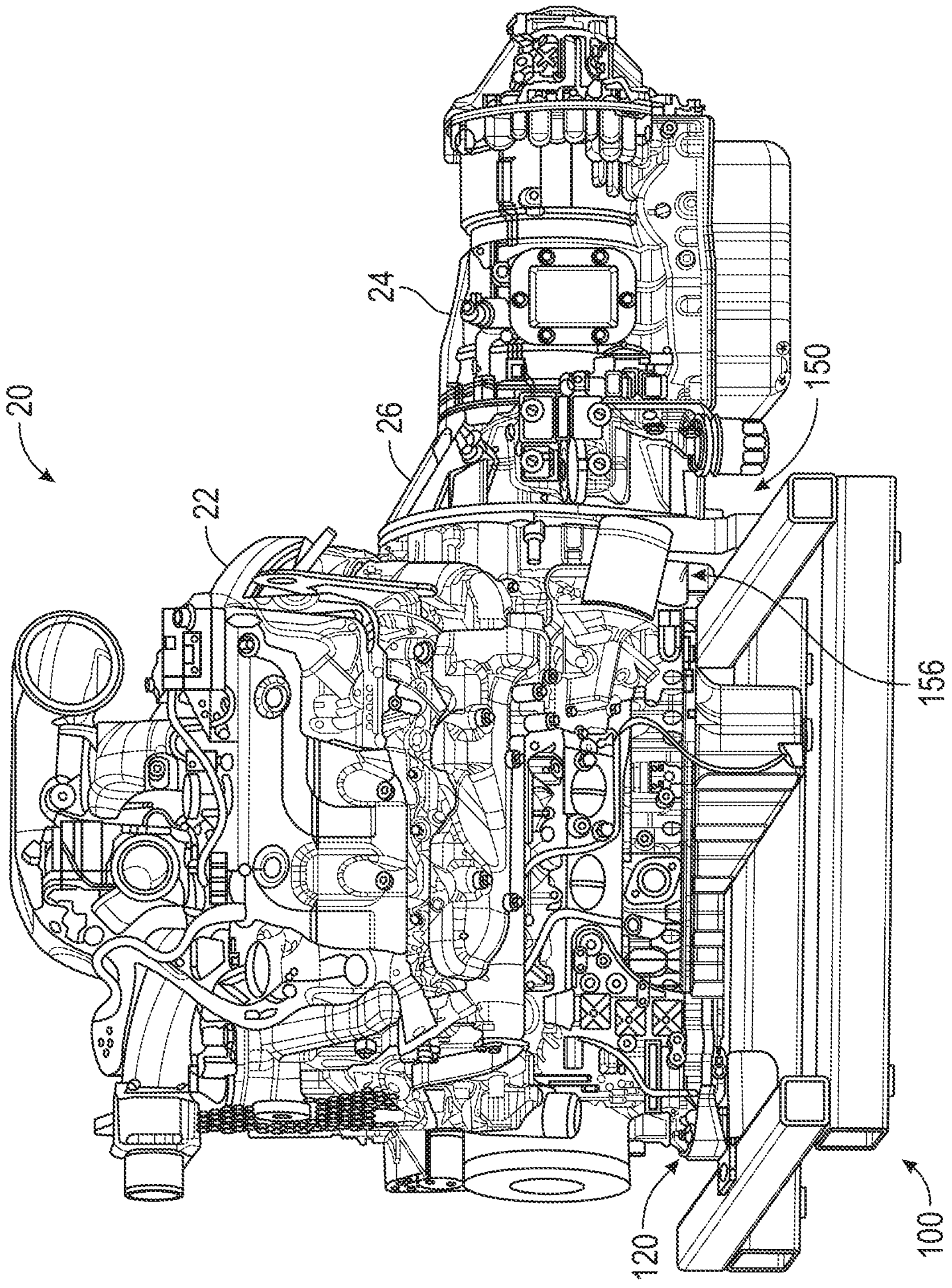

Referring to FIG. 2, the engine assembly 20 is shown coupled to the engine stand 10. The engine assembly 20 includes a primary driver (e.g., an engine, a motor, etc.), shown as engine 22. The engine 22 may be configured to receive fuel (e.g., gasoline, diesel, etc.) from a fuel tank and combust the fuel to generate mechanical energy. According to an exemplary embodiment, the engine 22 is a compression-ignition internal combustion engine configured to utilize diesel fuel. In alternative embodiments, the engine 22 is another type of device (e.g., spark-ignition engine, fuel cell, electric motor, etc.) that is otherwise powered (e.g., with gasoline, compressed natural gas, hydrogen, electricity, etc.). The engine 22 provides rotational mechanical energy to a transmission 24, which in turn is configured to provide rotational mechanical energy to the tractive elements (e.g., wheels) of a vehicle (e.g., through a transfer case, one or more drive shafts, one or more differentials, and/or one or more drive axles, etc.). A housing or enclosure, shown as bell housing 26, extends between and is selectively coupled to (e.g., fastened to) both the engine 22 and the transmission 24. The bell housing 26 removably couples the transmission 24 to the engine 22. The bell housing 26 additionally houses (e.g., at least partially encloses) one or more components rotationally coupling the engine 22 to the transmission 24 (e.g., a clutch assembly, a torque converter, a flywheel, etc.). A pair of mounts, shown as engine mounts 28, are coupled to and extend laterally outward from the bell housing 26. The engine mounts 28 facilitate connection of the engine assembly 20 to a body of a vehicle. The engine assembly 20 is defined as including the engine 22 and may include one or more of the transmission 24, the bell housing 26, and the engine mounts 28, depending upon the state of assembly of the engine assembly 20. By way of example, the cradle assembly 100 may be used to manipulate the engine assembly 20 with or without the transmission 24. As shown in FIG. 7, the engine 22 defines an aperture 30 extending substantially vertically. The aperture 30 may be configured to receive a component of a body of a vehicle (e.g., for use when mounting the engine assembly 20), or the aperture 30 may be configured specifically for use with the engine stand 10.

Figure 4:
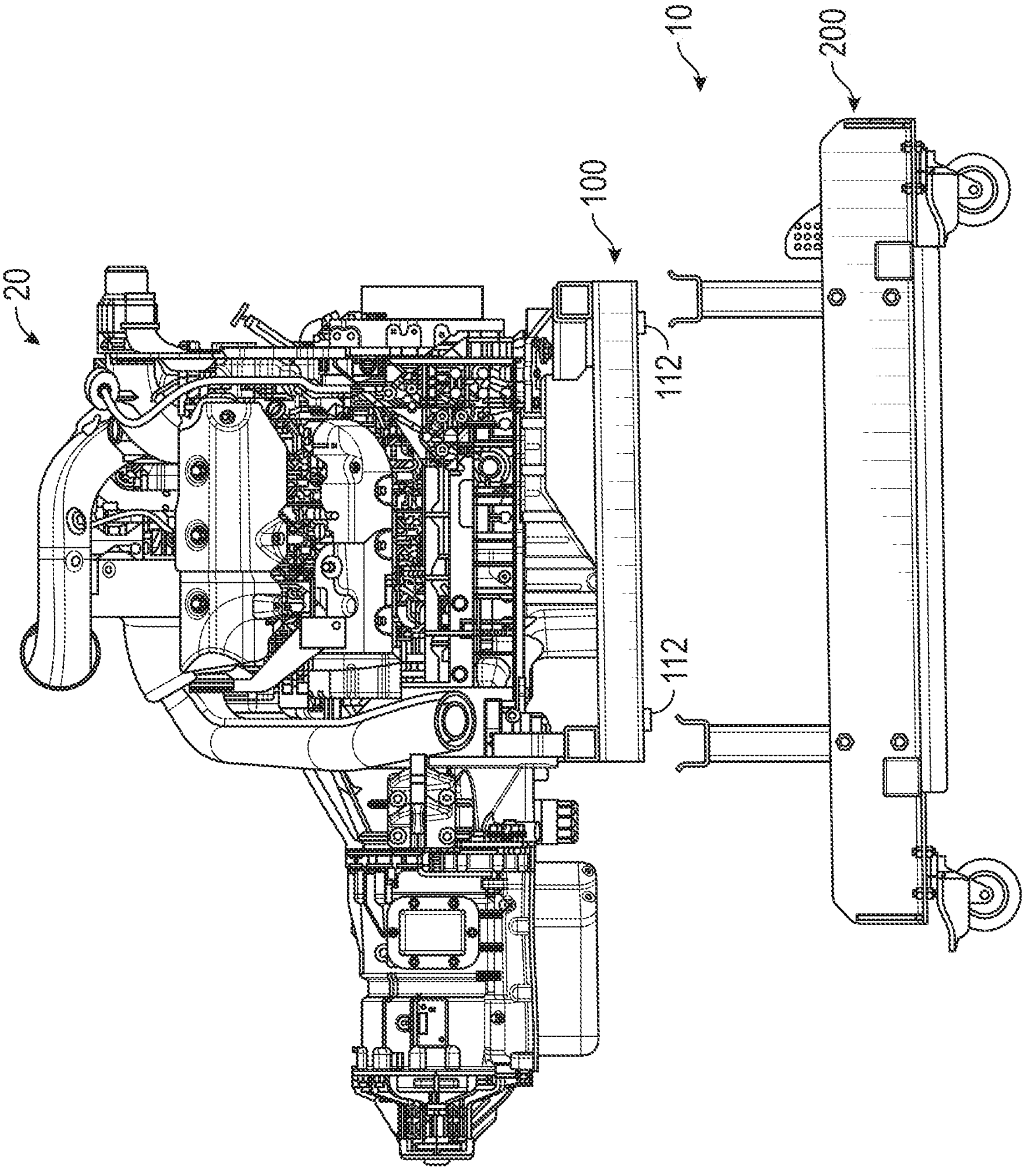
Figure 5:
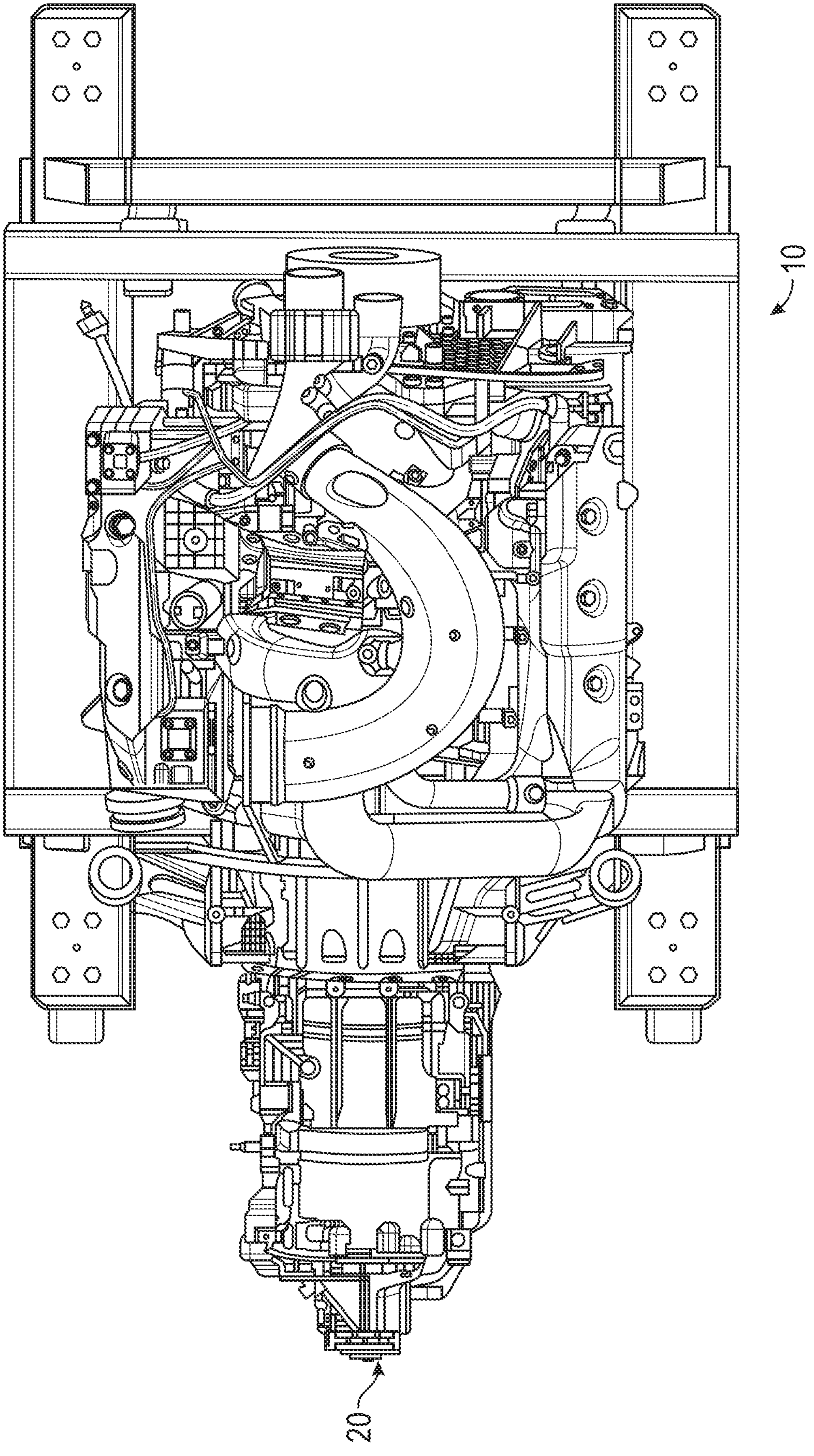
Figure 6:
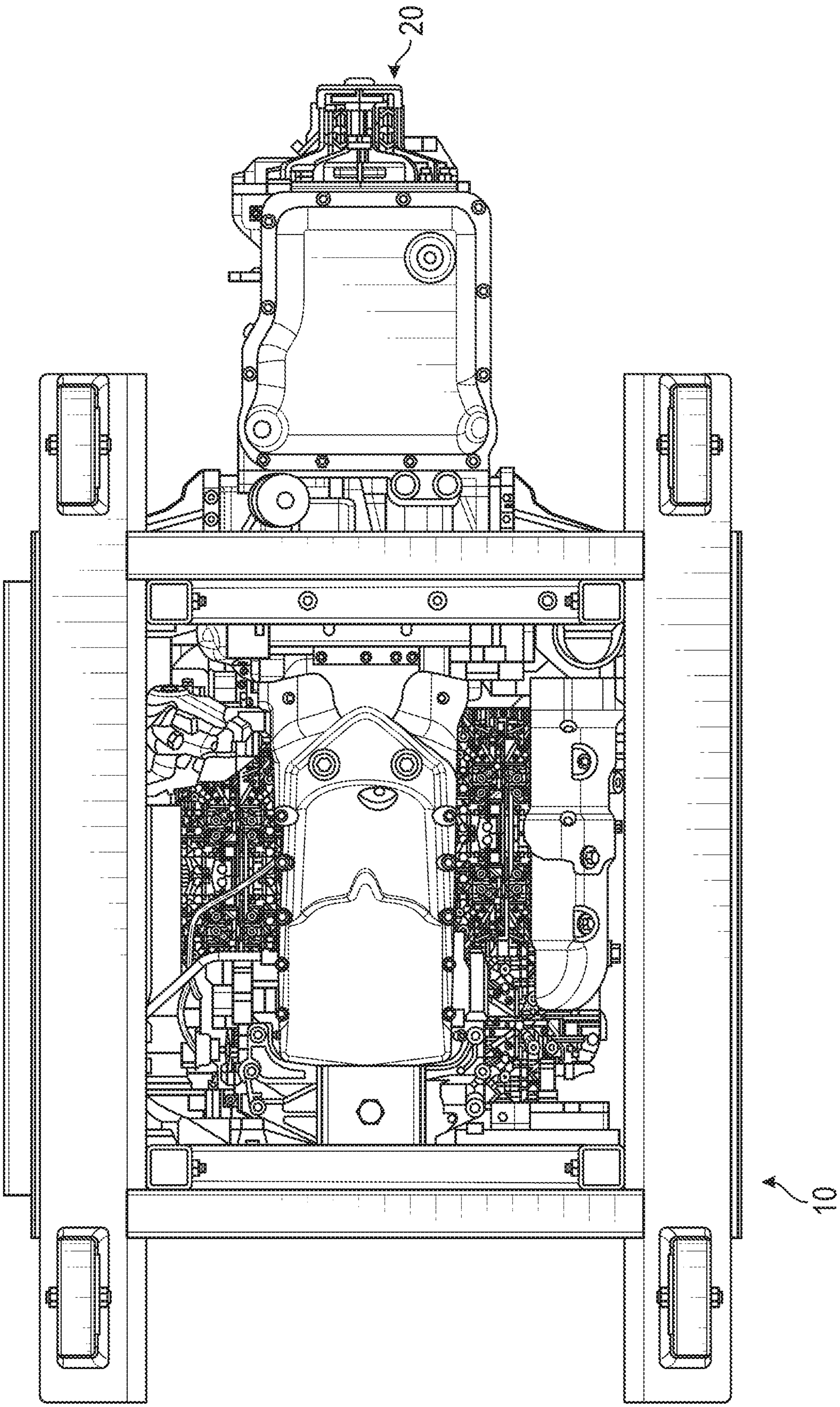
Figure 9:
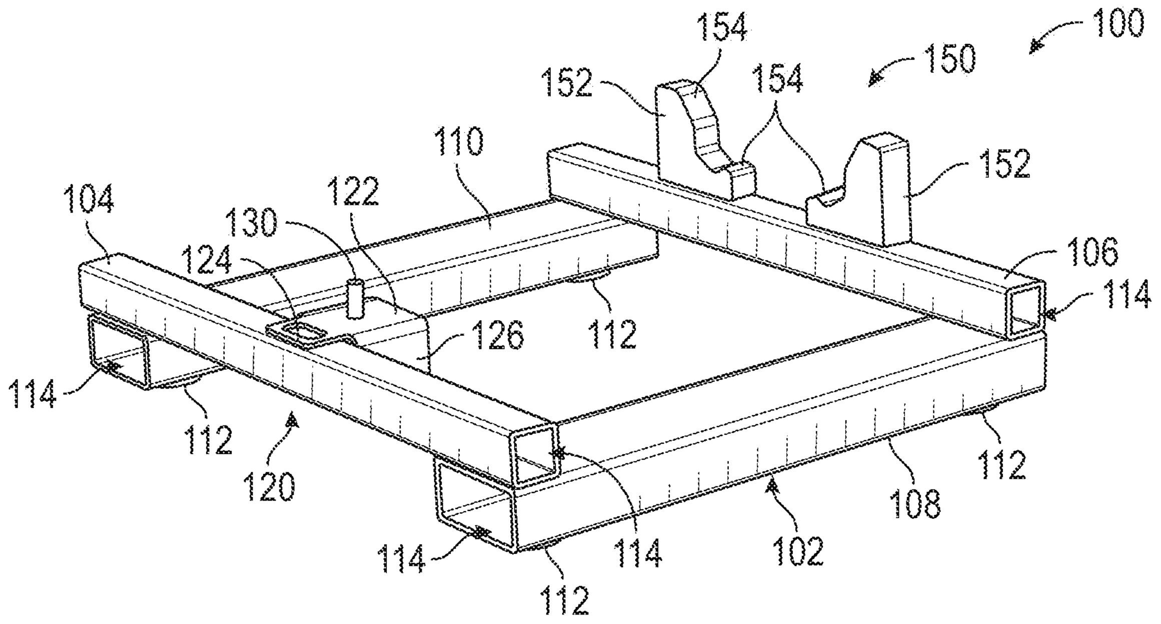
FIG. 9 is a perspective view of the cradle assembly of FIGS. 7 and 8.

Referring to FIG. 9, the cradle assembly 100 is shown according to an exemplary embodiment. The cradle assembly 100 includes a frame assembly, shown as upper frame assembly 102. The upper frame assembly 102 includes a pair of laterally-extending frame members, shown as first frame member 104 and second frame member 106. As shown in FIG. 9, the first frame member 104 and the second frame member 106 extend substantially parallel to one another. The upper frame assembly 102 further includes a pair of longitudinally-extending frame members, shown as third frame member 108 and fourth frame member 110. As shown in FIG. 9, the third frame member 108 and the fourth frame member 110 extend substantially parallel to one another. The first frame member 104 and the second frame member 106 are directly fixedly coupled (e.g., welded, adhered, fastened, etc.) to the top surfaces of the third frame member 108 and the fourth frame member 110 such that the upper frame assembly 102 forms a continuous loop. As shown in FIG. 4, the upper frame assembly 102 further includes one or more spacers, shown as feet 112, coupled to the third frame member 108 and the fourth frame member 110. The feet 112 extend downward from bottom surfaces of the third frame member 108 and the fourth frame member 110. The feet 112 engage the ground when the cradle assembly 100 is set directly on the ground, preventing the third frame member 108 and the fourth frame member 110 from contacting the ground if the ground is a level surface.

As shown in FIG. 9, each frame member of the upper frame assembly 102 is a tubular member having a rectangular cross-section. Each tubular member defines an aperture 114 extending along the length of the tubular member. The apertures 114 corresponding to the third frame member 108 and the fourth frame member 110 are each sized to receive a standard sized fork coupled to a lift device (e.g., a fork lift, a fork truck, a telehandler, etc.). This facilitates securely manipulating (e.g., lifting, rotating, translating, carrying, etc.) the cradle assembly 100 and the engine assembly 20 without additional chains or straps. Additionally or alternatively, the apertures 114 corresponding to the first frame member 104 and the second frame member 106 may each be sized to receive a standard sized fork.

Referring again to FIG. 9, the cradle assembly 100 further includes an engine attachment assembly, shown as pinning assembly 120. The pinning assembly 120 includes a bracket or plate, shown as bracket 122, directly coupled to the first frame member 104. The bracket 122 may be fixedly coupled (e.g., welded, adhered, etc.) or selectively slidably coupled to the first frame member 104. The bracket 122 defines a slot 124 extending laterally. In a first embodiment, a weld is placed along the perimeter of the slot 124 to fixedly couple the bracket 122 to the first frame member 104. Alternatively, a pair of fasteners may extend through the slot 124 and the first frame member 104 such that, when tightened, the fasteners fixedly couple the bracket 122 to the first frame member 104. If the fasteners are loosened, then the bracket 122 can slide relative to the first frame member 104. The bracket 122 further defines a pair of flanges 126. The flanges 126 extend downward from a top surface of the bracket 122 along the lateral sides of the bracket 122, increasing the bending strength of the bracket 122.

The pinning assembly 120 further includes a protrusion (e.g., a stud, a fastener, a pin, etc.), shown as stud 130, that extends substantially vertically upward from a top surface of the bracket 122. The stud 130 may be fixedly coupled to the bracket 122. The stud 130 is configured to be received by the aperture 30 of the engine 22 when the engine assembly 20 is coupled to the cradle assembly 100. Accordingly, the stud 130 may be sized to have a slip fit into the aperture 30 such that the stud 130 is slightly smaller than the aperture 30. When the engine assembly 20 is coupled to the cradle assembly 100, the stud 130 is received by the aperture 30, and the engine 22 rests on a top surface of the bracket 122. Accordingly, the stud 130 prevents relative horizontal translation between the engine assembly 20 and the stud 130, and the bracket 122 prevents downward motion of the engine assembly 20. The stud 130 may be substantially cylindrical such that the engine assembly 20 can be selectively decoupled from the stud 130 by lifting the engine assembly 20 vertically upwards.

Referring to FIG. 7, in some embodiments, the pinning assembly 320 further includes a retainer (e.g., a nut, a pin (e.g., a detent pin, a wire lock pin, a lynch pin, a cotter pin, etc.), a clamping collar, etc.), shown as nut 134, selectively coupled to the stud 130. Accordingly, a portion of the stud 130 may be threaded to facilitate connection to the nut 134. With the stud 130 extending through the aperture 30, the nut 134 may be coupled to the stud 130 above the portion of the engine 22 that defines the aperture 30 and tightened. The nut 134 prevents relative vertical motion between the cradle assembly 100 and the engine assembly 20. Such an arrangement prevents inadvertent decoupling of the engine assembly 20 from the cradle assembly 100. Accordingly, the nut 134 may be utilized in situations where the cradle assembly 100 and the engine assembly 20 are subjected to a significant amount of movement (e.g., during transport).

Referring to FIGS. 2,3, and 7-9, the cradle assembly 100 further includes a support assembly, shown as engine alignment assembly 150. The engine alignment assembly 150 includes one or more cushions, bumpers, rests, or support members, shown as rests 152, fixedly coupled to the second frame member 106. The rests 152 each have a surface, shown as engagement surface 154, that is configured to engage an exterior surface of the engine assembly 20. In one embodiment, the engagement surfaces 154 are configured to engage an exterior surface 156 of the bell housing 26. In other embodiments, the engagement surfaces 154 are configured to engage exterior surfaces of the engine 22, the transmission 24, the engine mounts 28, or another component of the engine assembly 20. The engine alignment assembly 150 is configured such that, while the cradle assembly 100 is coupled to the engine assembly 20, a bottom-facing portion of the exterior surface 156 (i.e., a portion of the exterior surface 156 facing at least partially vertically downward) contacts at least one of the engagement surfaces 154, and a pair of opposing laterally-facing portions of the exterior surface 156 (i.e., a portion of the exterior surface 156 facing at least partially laterally in a first direction and another portion of the exterior surface 156 facing at least partially laterally in a second direction opposite the first direction) each contact at least one of the engagement surfaces 154. Contact between the bottom-facing portion and an engagement surface 154 prevents the engine assembly 20 from moving vertically downward relative to the engine alignment assembly 150. Contact between the opposing laterally-facing portions and the engagement surfaces 154 prevents relative lateral movement between the engine assembly 20 and the engine alignment assembly 150. Accordingly, when the engine assembly 20 is coupled to the cradle assembly 100, the engine alignment assembly 150 prevents the engine assembly 20 from rotating about the stud 130.

Figure 10:
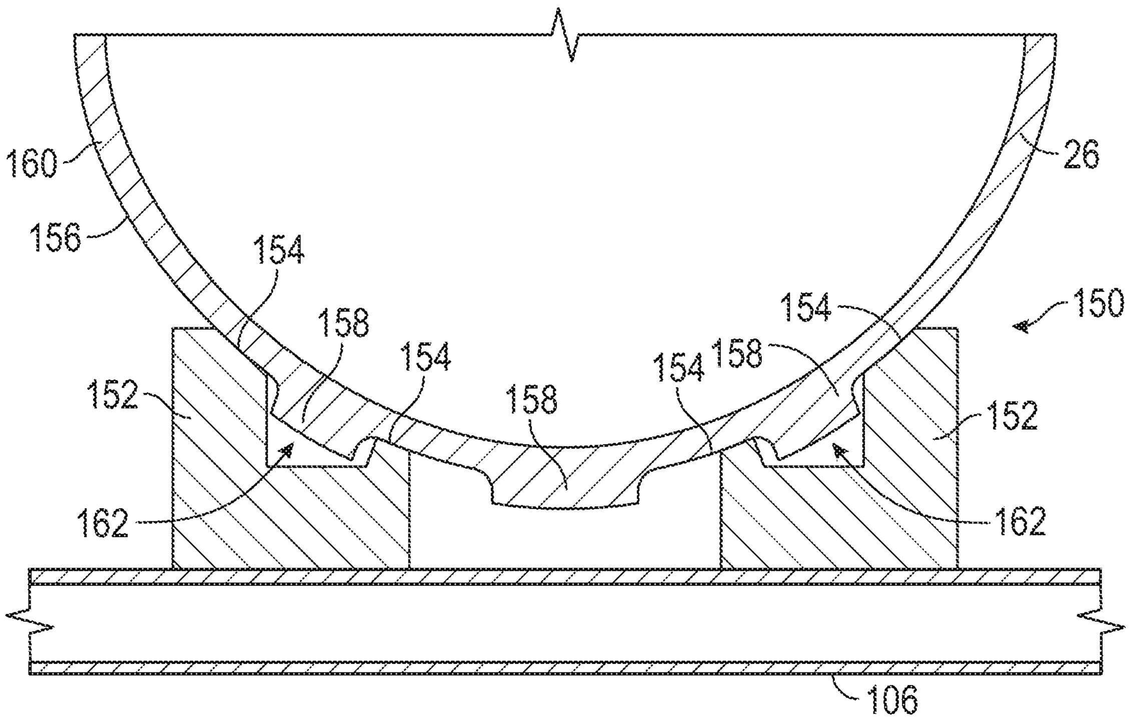
FIGS. 10-12 are section views of a cradle assembly for an engine stand supporting an engine assembly, according to various exemplary embodiments.
Figure 11:
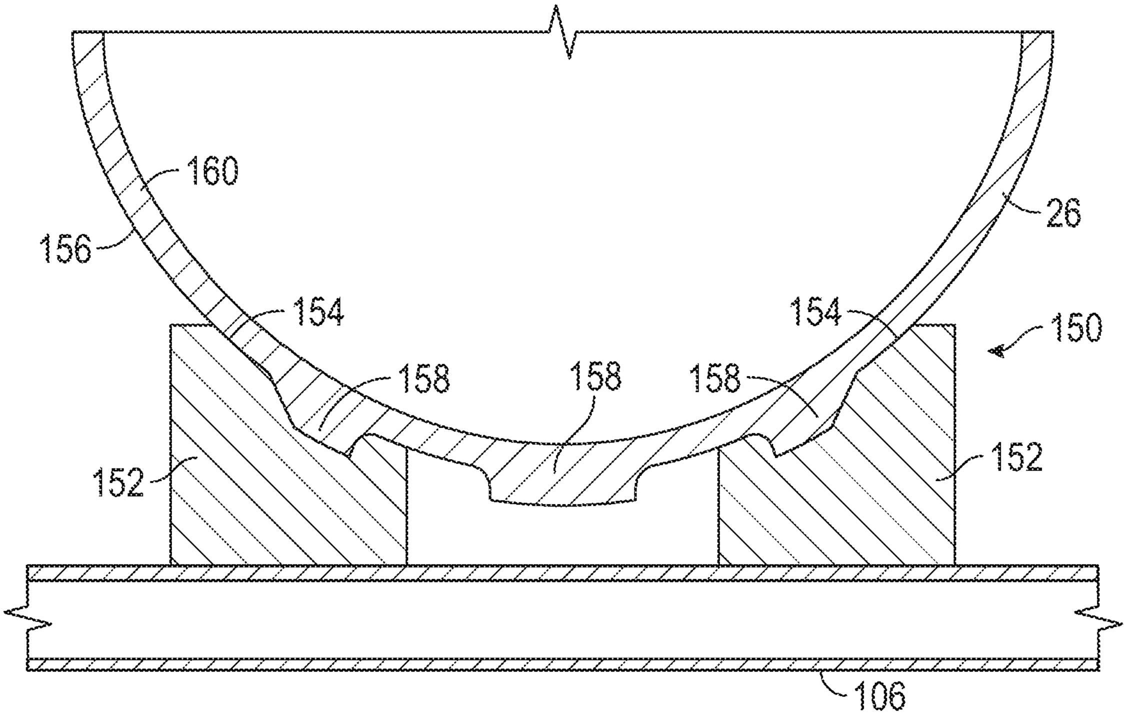
Figure 12:
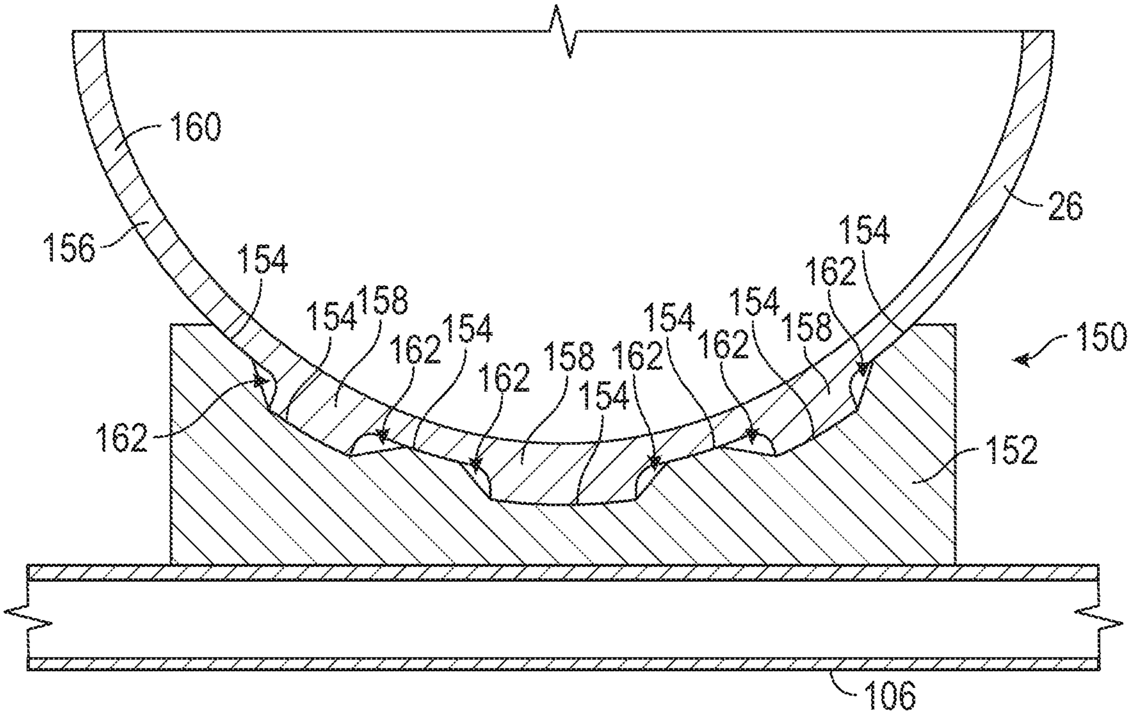

FIGS. 10-12 show a cross section of the engine alignment assembly 150 according to various exemplary embodiments. In each embodiment, the one or more rests 152 are configured such that the shapes of the one or more engagement surfaces 154 correspond to the shape of the exterior surface 156 of the bell housing 26 (i.e., the one or more rests 152 are shaped to correspond to the shape of the exterior surface 156). In the embodiments shown, the bell housing 26 includes a number of protrusions 158 (e.g., fasteners, structural ribs, flanges, etc.) extending outward from a main body 160 of the bell housing 26. Referring to FIG. 10, the engine alignment assembly 150 includes a pair of rests 152 spaced apart laterally. Each of the rests 152 contacts the exterior surface 156 along two engagement surfaces 154. As shown, the portions of the exterior surface 156 contacting the rests 152 are round, and engagement surfaces 154 are each shaped to have a radius of curvature substantially similar to that of the corresponding portion of the exterior surface 156. Between the two engagement surfaces 154, each rest 152 defines a cutout 162 configured to receive a protrusion 158. The cutout 162 is larger than the protrusion 158 such that the cutout provides clearance between the protrusion 158 and the rest 152. The cutouts 162 facilitate removal of the protrusions 158 from the rests 152 without interference. Accordingly, each rest 152 is configured such that the shapes of both engagement surfaces 154 correspond to the shape of the exterior surface 156, but the inner surface of the cutout 162 between the two engagement surfaces 154 is not shaped to correspond to the shape of the exterior surface 156.

Referring to FIG. 11, the engine alignment assembly includes a pair of rests 152 spaced apart laterally. Each of the rests 152 contacts the exterior surface 156 along a single continuous engagement surface 154 that spans a protrusion 158. As shown, some portions of the exterior surface 156 contacting the rests 152 are round, and the engagement surfaces 154 are each shaped to have a radius of curvature substantially similar to that of the corresponding portion of the exterior surface 156. Other portions of the exterior surface 156 contacting the rests 152 are flat (e.g., along the protrusion 158), and the engagement surfaces 154 are each shaped to have a flat surface substantially parallel to the corresponding portion of the exterior surface 156. Accordingly, each rest 152 is configured such that the shape of the engagement surface 154 corresponds to the shape of the exterior surface 156, regardless of the curvature of the exterior surface 156.

Referring to FIG. 12, the engine alignment assembly includes a single rest extending along both lateral sides of the bell housing 26. The rest 152 contacts the exterior surface 156 along multiple engagement surfaces 154 located between and contacting the protrusions 158. As shown, the portions of the exterior surface 156 contacting the rests 152 are round, and the engagement surfaces 154 are each shaped to have a radius of curvature substantially similar to the corresponding portion of the exterior surface 156. Between each set of adjacent engagement surfaces 154, the rest 152 defines a cutout 162. The cutouts 162 are located on either side of each protrusion 158 and facilitate removal of the protrusions 158 from the rests 152 without interference. Accordingly, the rest 152 is configured such that the shapes of the engagement surfaces 154 correspond to the shape of the exterior surface 156, except for small areas of the rest 152 near the edges of each protrusion 158.

As shown in FIGS. 10-12, a portion of at least one of the engagement surfaces 154 of each rest 152 is angled relative to a horizontal plane (e.g., a plane in which the first frame member 104 and the second frame member 106 extend, etc.). Alternatively, another surface of each rest 152 (e.g., a surface that is not in contact with the engine assembly 20 when the engine assembly 20 is coupled to the cradle assembly 100) is angled relative to the horizontal plane. These angled surfaces face partially upward and partially in a lateral direction. Accordingly, if the engine assembly 20 is laid onto the cradle assembly 100 off center, one or more of the angled portions contact the engine assembly 20, forcing the engine assembly 20 laterally toward the center of the rest 152 or rests 152. This effect is beneficial, as it places the engine assembly 20 in a consistent location relative to the cradle assembly 100 as long as the engine assembly 20 contacts the rests 152 within a predefined range of locations, reducing the alignment burden of an operator.

Figure 20:
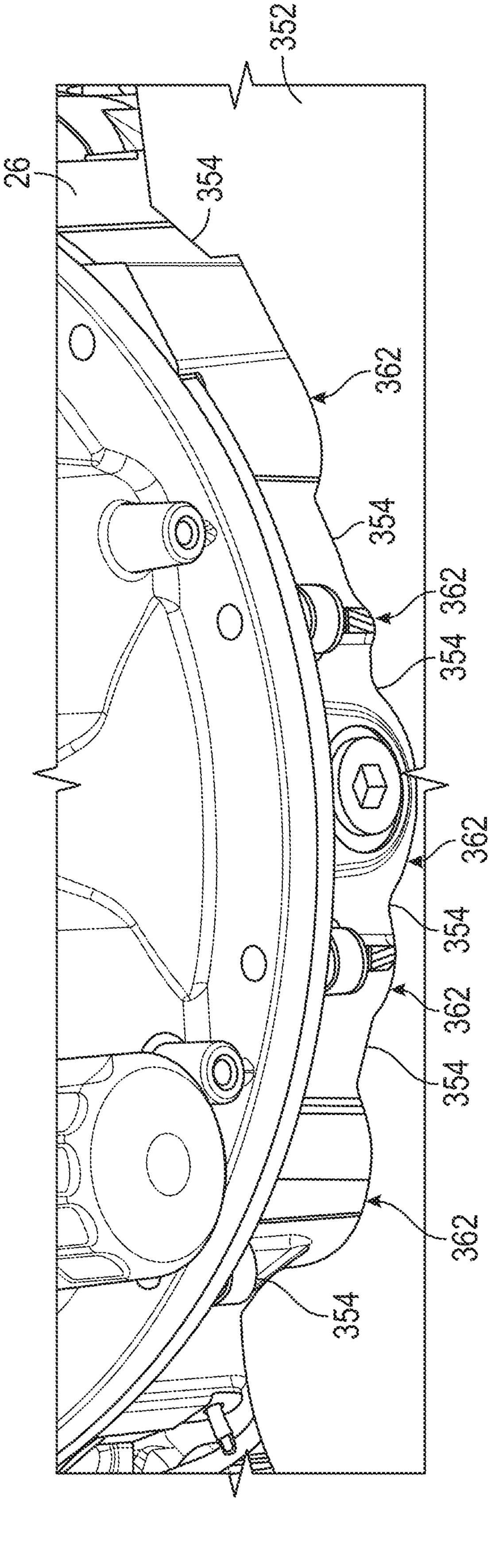
Figure 21:
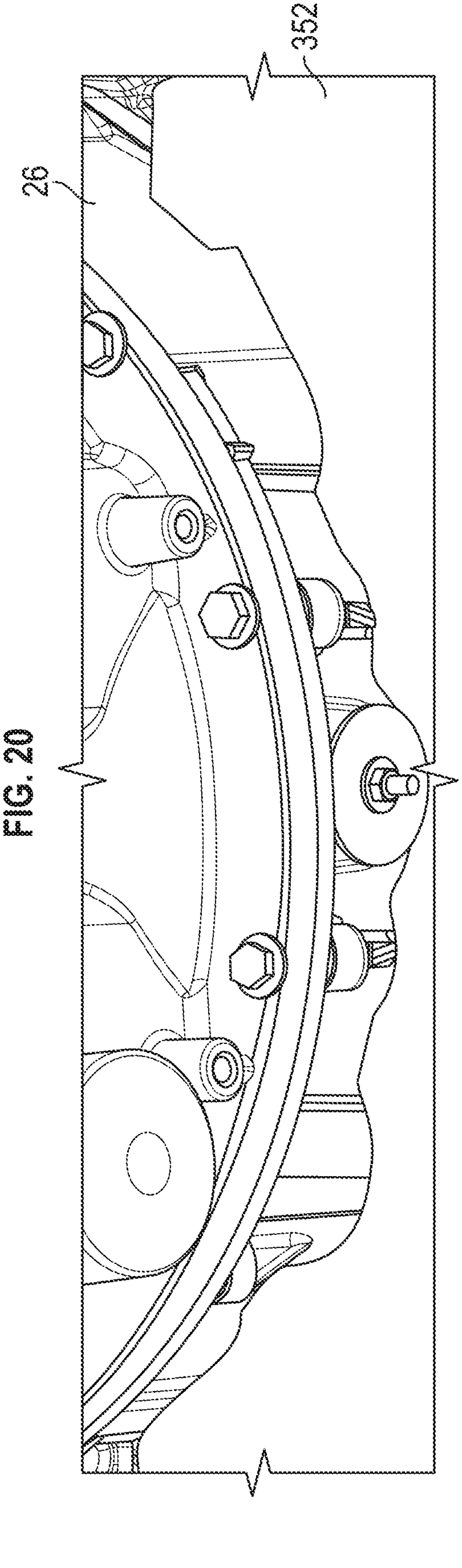
Figure 22:
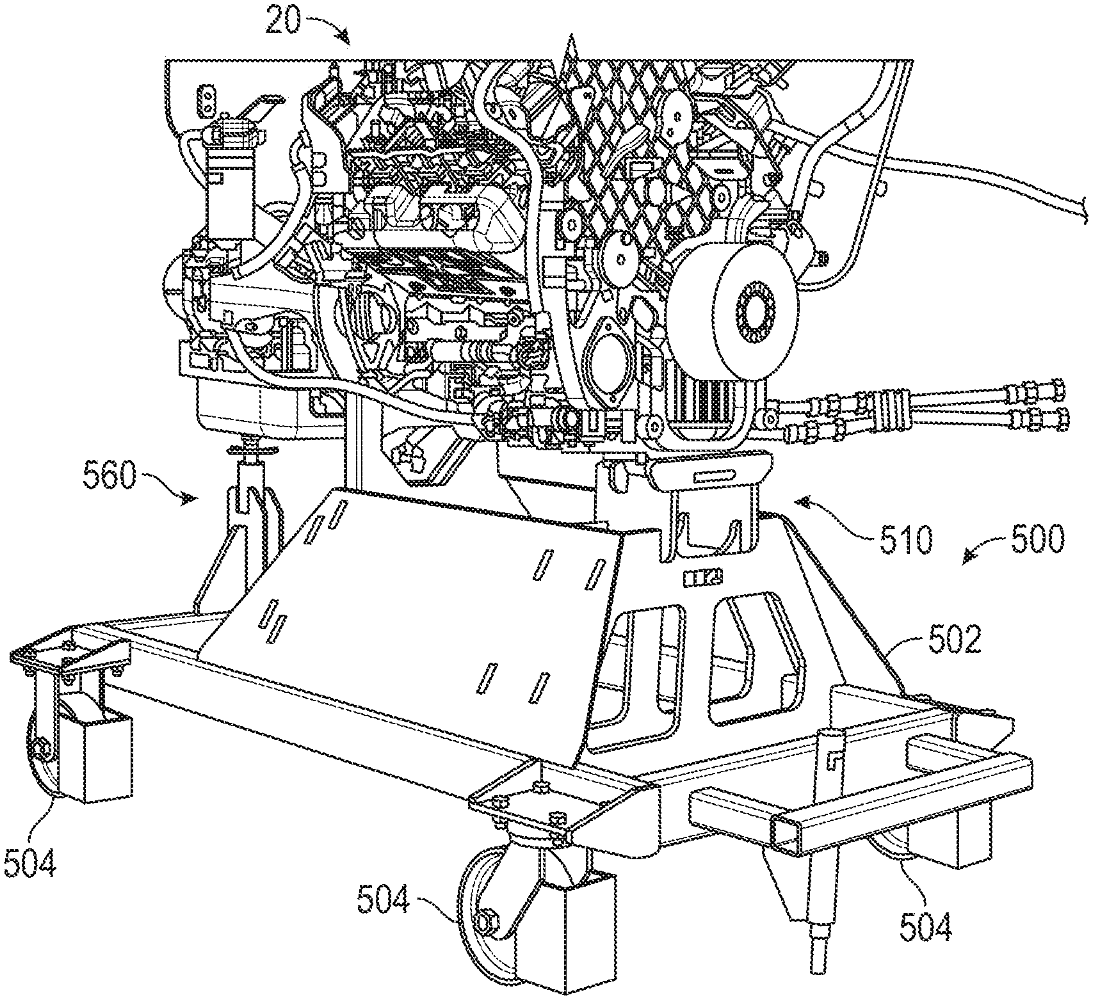
FIGS. 22-30 are various views of an engine stand supporting an engine assembly, according to another exemplary embodiment.
Figure 23:
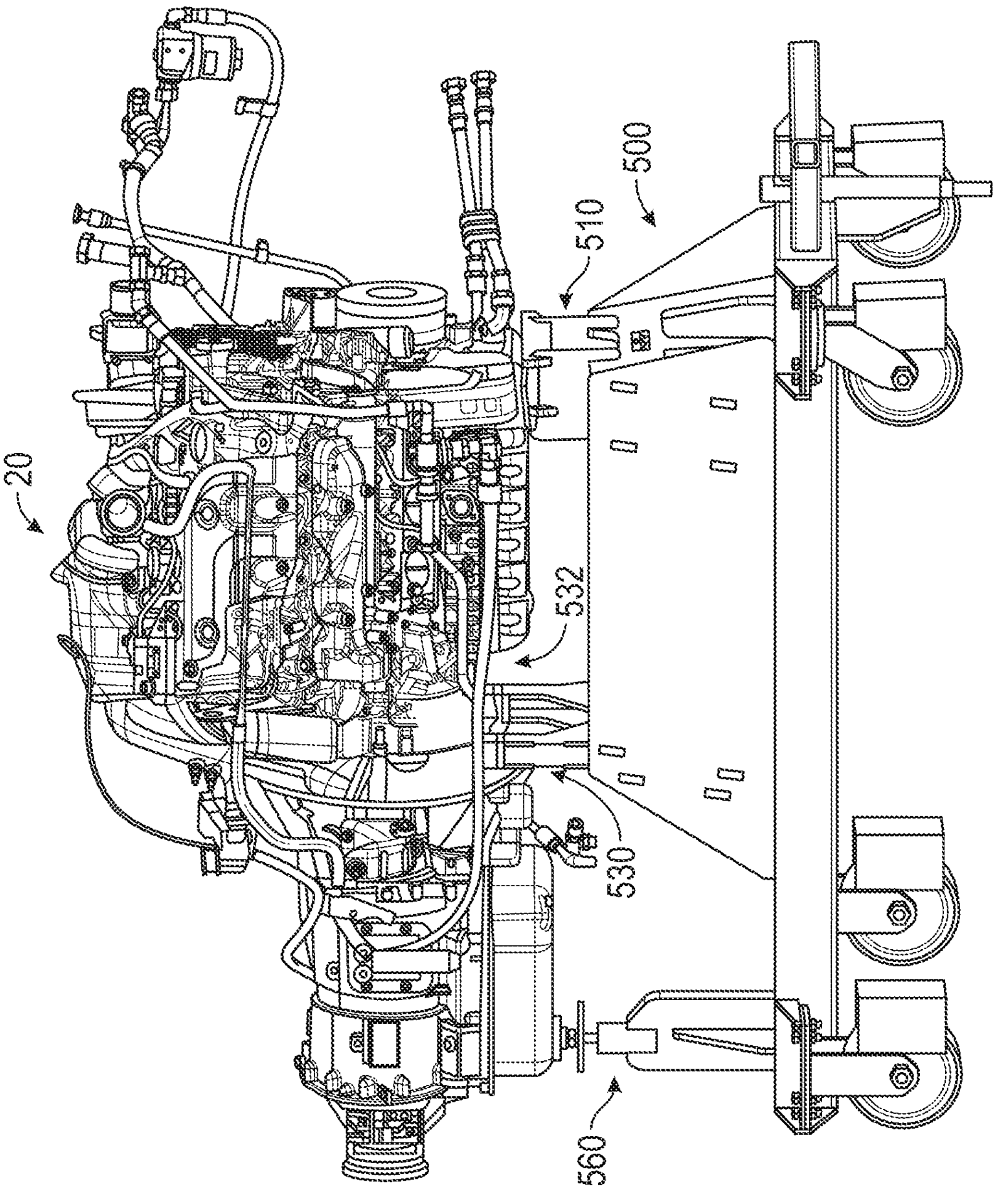
Figure 24:
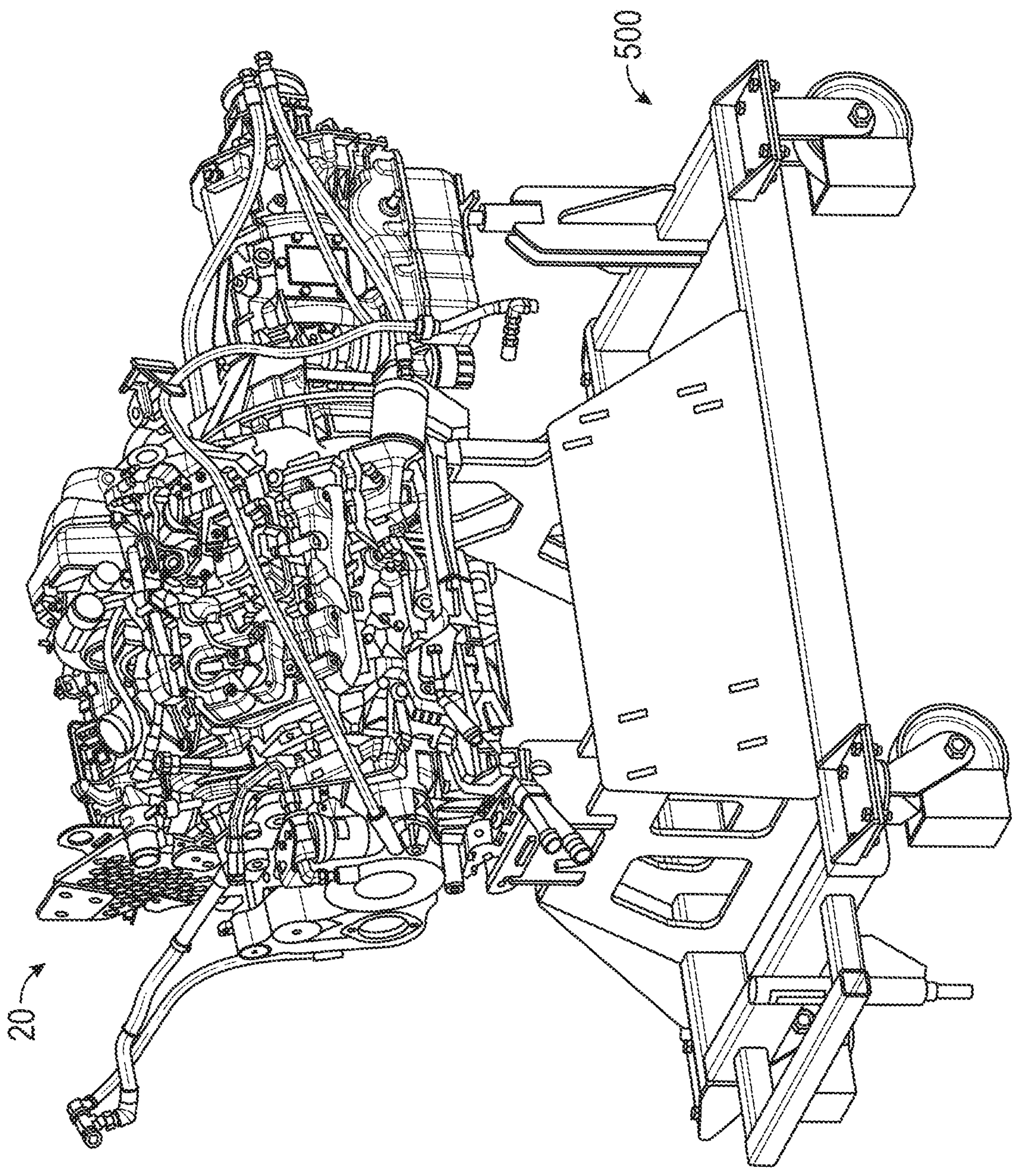
Figure 25:
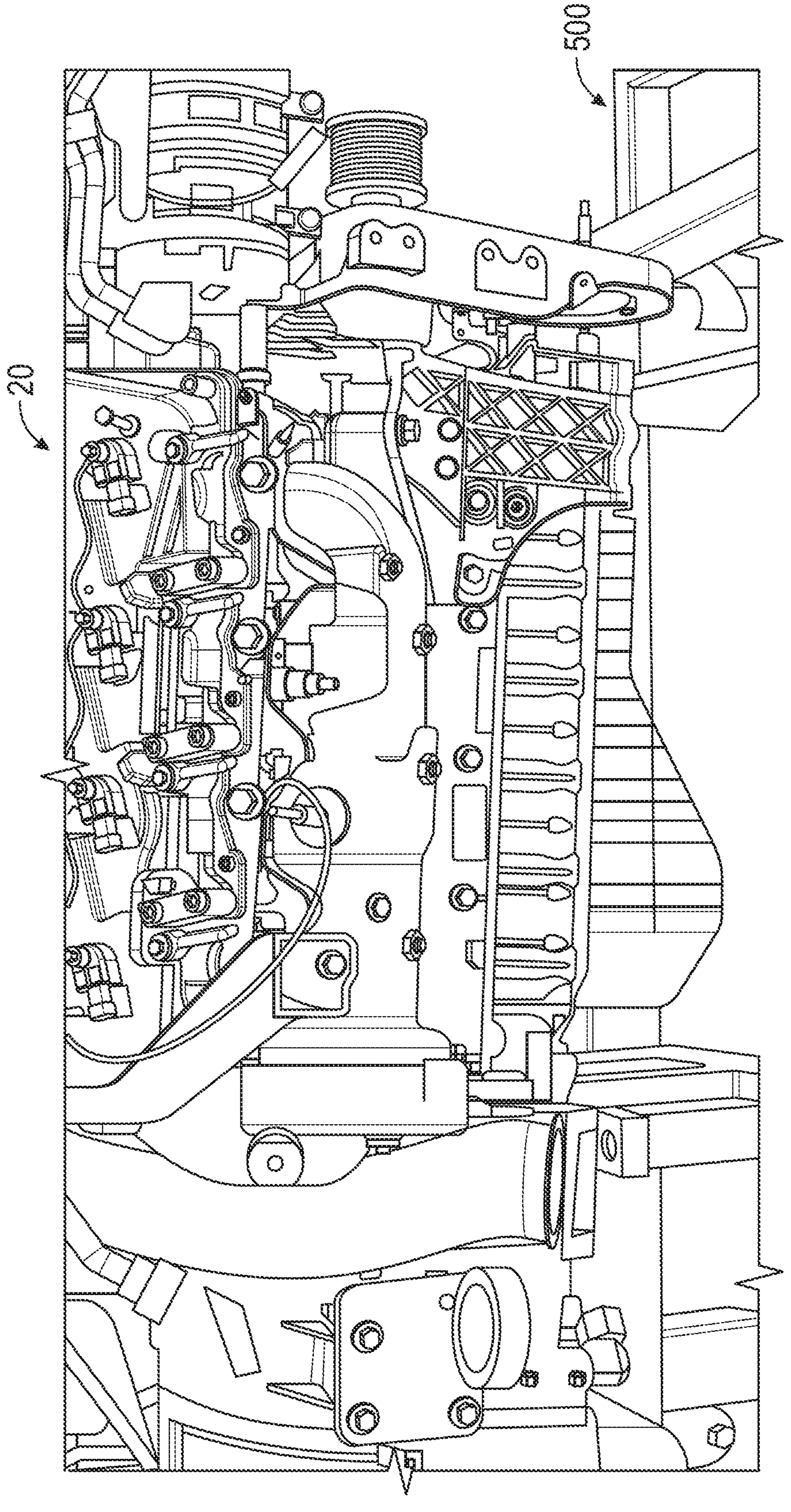

The rests 152 may be made from a rigid material (e.g., steel, aluminum, etc.) or a relatively flexible material (e.g., plastic, rubber, etc.). In embodiments that utilize rigid materials, the rest 152 may deform only a negligible amount under the weight of the engine assembly 20. Accordingly, when using rigid materials, the rests 152 may be initially manufactured such that the shapes of the engagement surfaces 154 correspond to the shape of the exterior surface 156 (e.g., as shown in FIG. 20). In other embodiments that utilize relatively flexible materials, the rests 152 may deform (e.g., elastically) a significant amount under the weight of the engine assembly 20. Accordingly, when using flexible materials, the rests 152 may be manufactured such that the shapes of the engagement surfaces 154 do not correspond to the shape of the exterior surface 156 until the weight of the engine assembly 20 is placed onto the rests 152. In such an embodiment, the rests 152 may conform to the shape of the engine assembly 20 as the weight of the engine assembly 20 is applied, thereby shaping the engagement surfaces 154 to correspond to the shape of the exterior surface 156. FIG. 21 shows both a deformed state and a non-deformed state of a rest 352, illustrating the degree to which a rest might compress in such an embodiment.

Figure 3:
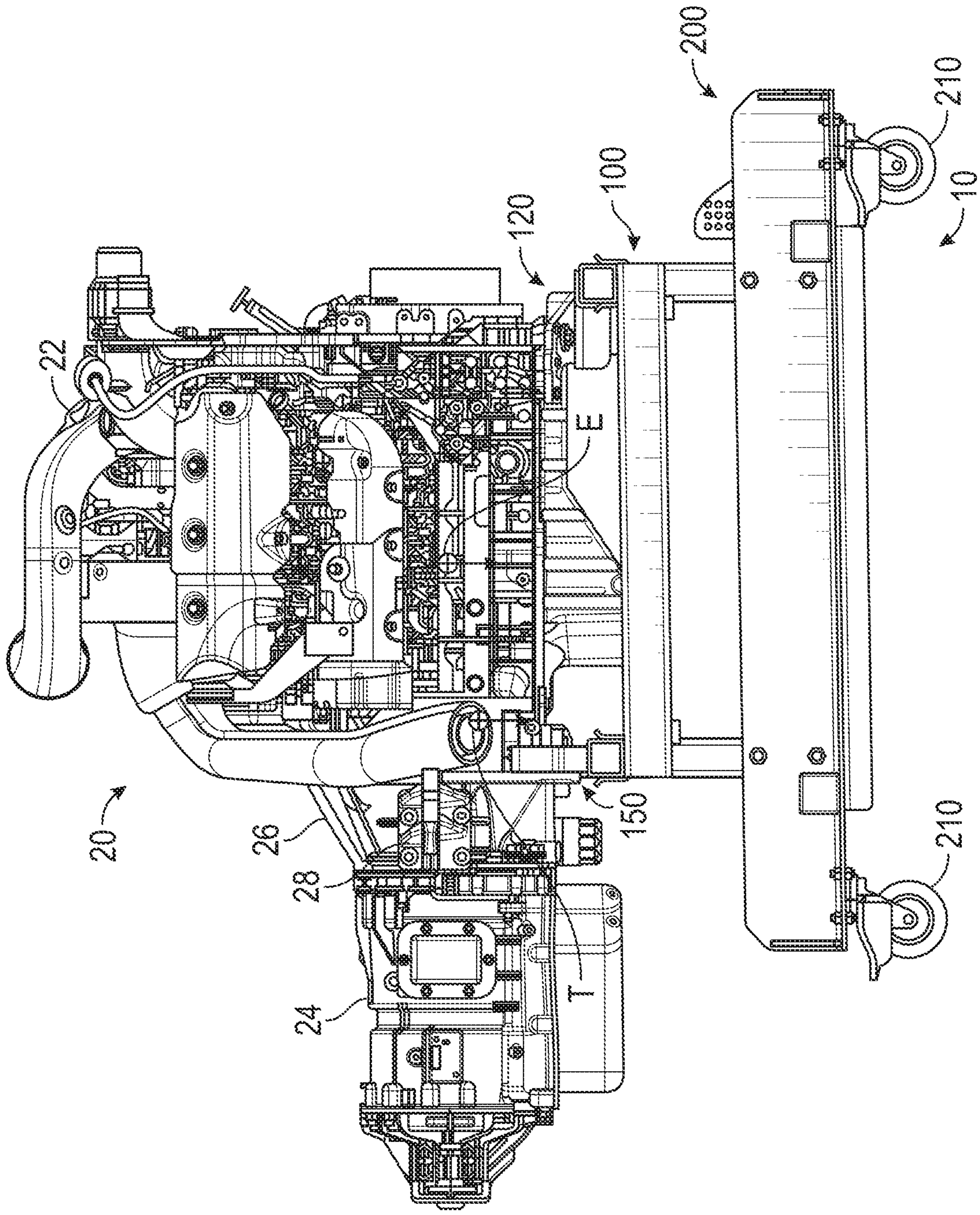

Referring to FIG. 3, the center of gravity of the engine assembly 20 is shown. The center of gravity T represents the longitudinal location of the center of gravity of the engine assembly 20 with the transmission 24 coupled to the engine 22. The center of gravity E represents the longitudinal location of the center of gravity of the engine assembly 20 without the transmission 24 coupled to the engine 22. In both cases, the center of gravity of the engine assembly 20 is located longitudinally between a set of front casters 210 and a set of rear casters 210 that support the engine stand 10. Accordingly, the engine stand 10 is stable with the engine assembly 20 on the dolly 200. Additionally, in both cases, the center of gravity of the engine assembly 20 is located longitudinally between the engine alignment assembly 150 and the pinning assembly 120. Accordingly, the engine assembly 20 is stable when the cradle assembly 100 is placed on the ground. However, in other embodiments, the locations of the centers of gravity may change. Accordingly, the engine stand 10 may require additional support to stably hold the engine assembly 20 in place. By way of example, one or more jack stands may be used to support the transmission 24 directly.

Referring to FIGS. 1 and 2, the dolly 200 is shown according to an exemplary embodiment. The dolly 200 includes a frame assembly, shown as lower frame assembly 202. The lower frame assembly 202 includes a pair of first frame members, shown as frame members 204, longitudinally offset from one another. The frame members 204 extend between and are fixedly coupled to a pair of longitudinally-extending frame members, shown as frame members 206. The lower frame assembly 202 further includes a set of vertically-extending frame members, shown as frame members 208. The frame members 208 are each arranged adjacent and fixedly coupled to one of the frame members 204 and one of the frame members 206. A set of rolling elements or wheels, shown as casters 210, are each rotatably coupled to the frame members 206 near the corners of the lower frame assembly 202. The casters 210 may be configured to each selectively rotate about both a vertical axis and a horizontal axis, facilitating free movement of the dolly 200 across the ground in any direction. The placement of the casters near the corners of the lower frame assembly 202 facilitates stabilizing the load of the engine assembly 20, preventing the engine stand 10 from tipping.

The dolly 200 further includes a set of u-shaped brackets, shown as receiving channels 220. Each receiving channel 220 is directly fixedly coupled to the top end of one of the frame members 208. The receiving channels 220 are each arranged to open laterally and upwards. The receiving channels 220 near the front end of the dolly 200 are configured to receive the first frame member 104, and the receiving channels 220 near the rear end of the dolly 200 are configured to receive the second frame member 106. When the receiving channels 220 receive the first frame member 104 and the second frame member 106, the bases of the receiving channels 220 prevent the cradle assembly 100 from moving vertically downward relative to the dolly 200, and the vertical walls of the receiving channels 220 prevent the cradle assembly 100 from moving longitudinally relative to the dolly 200. When the receiving channels 220 receive the first frame member 104 and the second frame member 106, the receiving channels 220 and/or the frame members 208 can contact the third frame member 108 or the fourth frame member 110 to prevent relative lateral movement between the cradle assembly 100 and the dolly 200. Accordingly, the receiving channels 220 and the frame members 208 may be spaced apart laterally such that they are located immediately inward of the third frame member 108 and the fourth frame member 110, thereby minimizing relative lateral movement while still allowing relative vertical movement. As the receiving channels 220 open upward, the cradle assembly 100 can be selectively decoupled from the dolly 200 merely by exerting an upward vertical force on the cradle assembly 100, as shown in FIGS. 3 and 4. However, the weight of the cradle assembly 100 and/or the engine assembly 20 prevents the cradle assembly 100 from being lifted inadvertently. The receiving channels 220 each further include a pair of flanges 222 bent outwardly from each vertical wall. The flanges 222 increase the size of the opening to each receiving channel 220, facilitating placement of the cradle assembly 100 into the receiving channels 220 without precise longitudinal positioning of the cradle assembly 100.

FIGS. 13-21 illustrate an engine stand 12 as an alternative embodiment of the engine stand 10. The engine stand 12 may be substantially similar to the engine stand 10, except as otherwise specified herein. The engine stand 12 includes a cradle assembly 300 configured to be selectively coupled to the engine assembly 20 and a dolly 400 that is configured to be selectively coupled to the cradle assembly 300.

The cradle assembly 300 includes an upper frame assembly 302 including a first frame member 304, a second frame member 306, a third frame member 308, and a fourth frame member 310. Unlike in the upper frame assembly 102, the first frame member 304 and the second frame member 306 are directly fixedly coupled to the inner lateral surfaces of the third frame member 308 and the fourth frame member 310 instead of the top surfaces. The third frame member 308 and the fourth frame member 310 each define an aperture 314 extending along their respective lengths.

Referring to FIGS. 15-19, the cradle assembly 300 further includes a pinning assembly 320 coupled to the first frame member 304. The pinning assembly 320 includes a bracket 322 having a slot 324 and a pair of flanges 326. The bracket 322 is substantially similar to the bracket 122 except that the fixed stud 130 is replaced with a fastener 330 that selectively extends through an aperture 332 defined in the bracket 322. The aperture 332 extends substantially vertically such that the fastener 330 extends substantially vertically through the aperture 332. When the cradle assembly 300 is coupled to the engine assembly 20, the aperture 332 aligns with the aperture 30, and the fastener 330 extends through the aperture 332 and the aperture 30. In some embodiments, the aperture 332 is a slot to facilitate insertion of the fastener 330 even if the engine assembly 20 is slightly misaligned with the cradle assembly 300. The pinning assembly 320 further includes a nut 334 selectively coupled to the fastener 330. With the fastener 330 extending through the aperture 332 and the aperture 30, the nut 334 may be coupled to the fastener 330 above the portion of the engine 22 that defines the aperture 30 and tightened. The nut 334 prevents relative vertical motion between the cradle assembly 300 and the engine assembly 20.

Referring to FIGS. 15, 18, 20, and 21, the cradle assembly 300 further includes an engine alignment assembly 350. The engine alignment assembly 350 includes a rest 352, which may be substantially similar to the rest 152. The rest 352 defines a number of engagement surfaces 354 configured to engage the exterior surface 156 of the bell housing 26. The rest 352 further defines a number of cutouts 362 configured to receive protrusions 158 from the bell housing 26. Instead of coupling to a top surface of the second frame member 306, however, the rest 352 couples to a rear surface of the second frame member 306. The rest 352 defines multiple laterally-extending slots, shown as slots 364. In a first embodiment, a weld is placed along the perimeter of each slot 364 to fixedly couple the rest 352 to the second frame member 306. Alternatively, one or more fasteners may extend through each slot 364 and the second frame member 306 such that, when tightened, the fasteners fixedly couple the rest 352 to the second frame member 306. If the fasteners are loosened, then the rest 352 can slide relative to the second frame member 306. The fasteners also facilitate removal of the rest 352.

Figure 13:
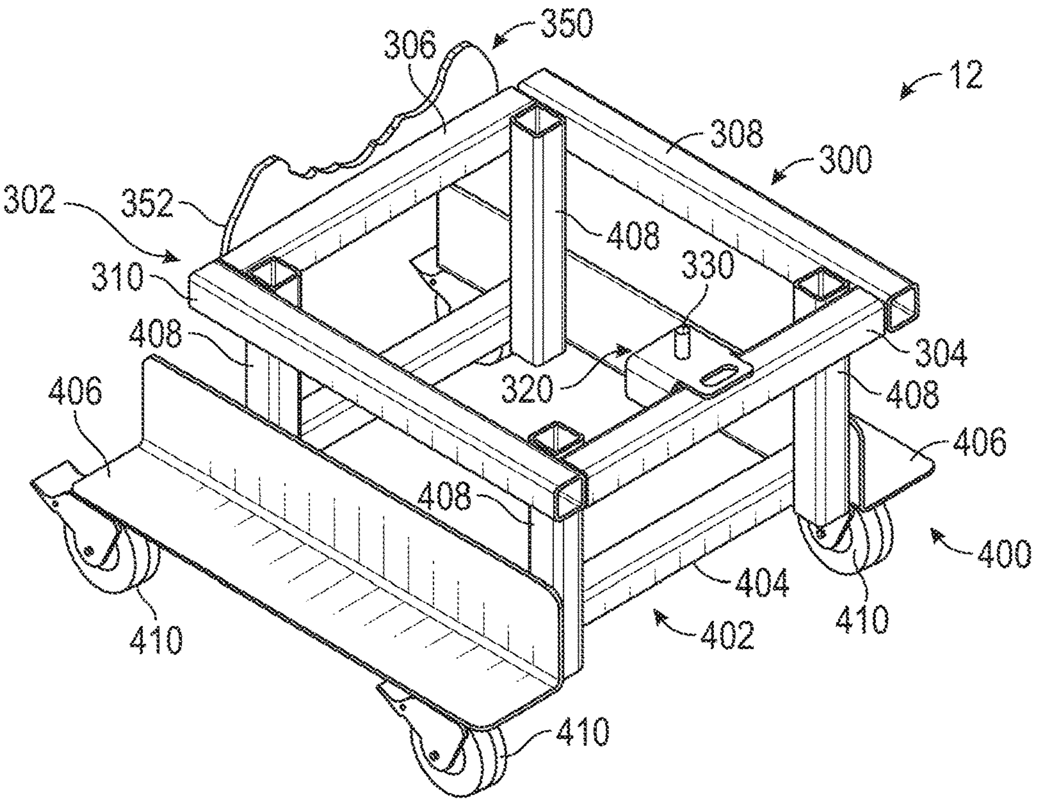
FIGS. 13 and 14 are perspective views of an engine stand, according to another exemplary embodiment.
Figure 14:
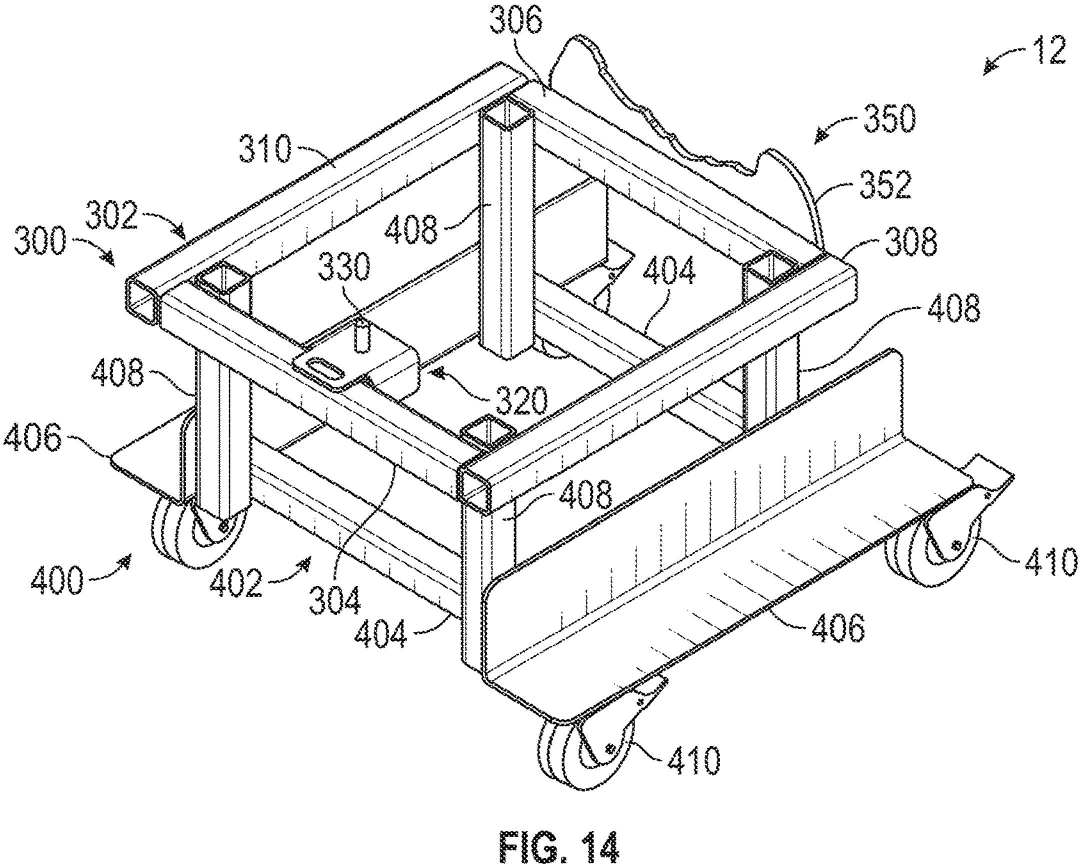
Figure 15:
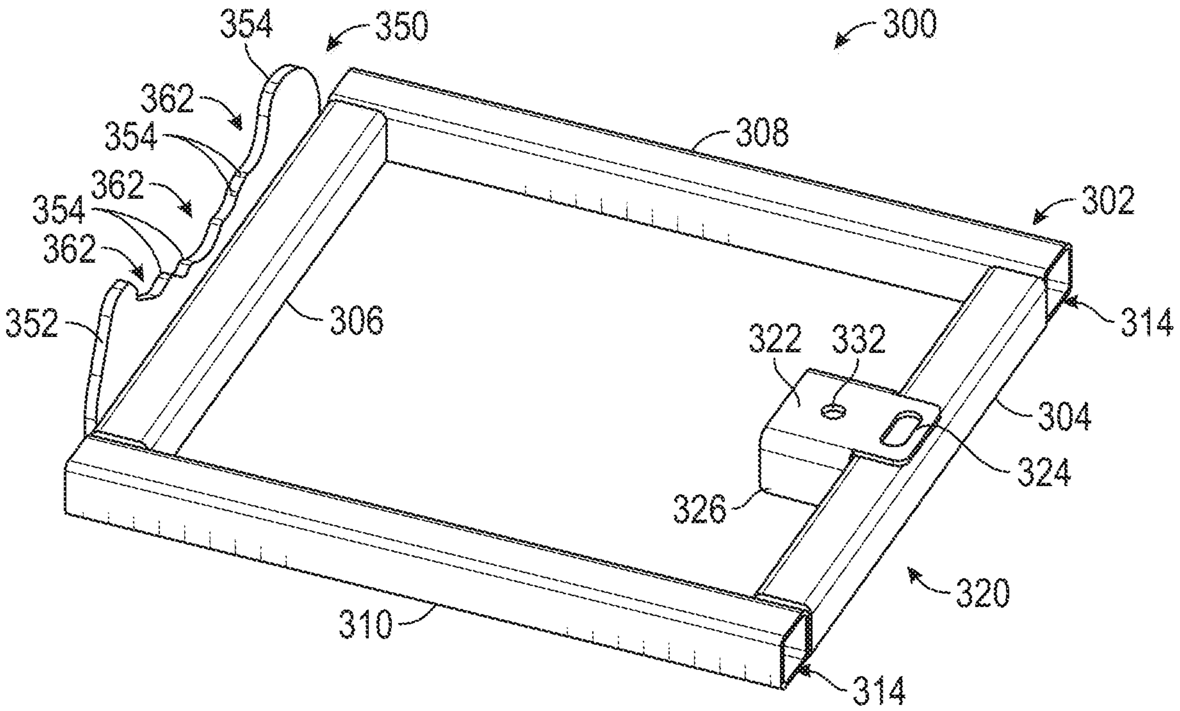
FIG. 15 is a perspective view of a cradle assembly of the engine stand of FIGS. 13 and 14, according to an exemplary embodiment.
Figure 16:
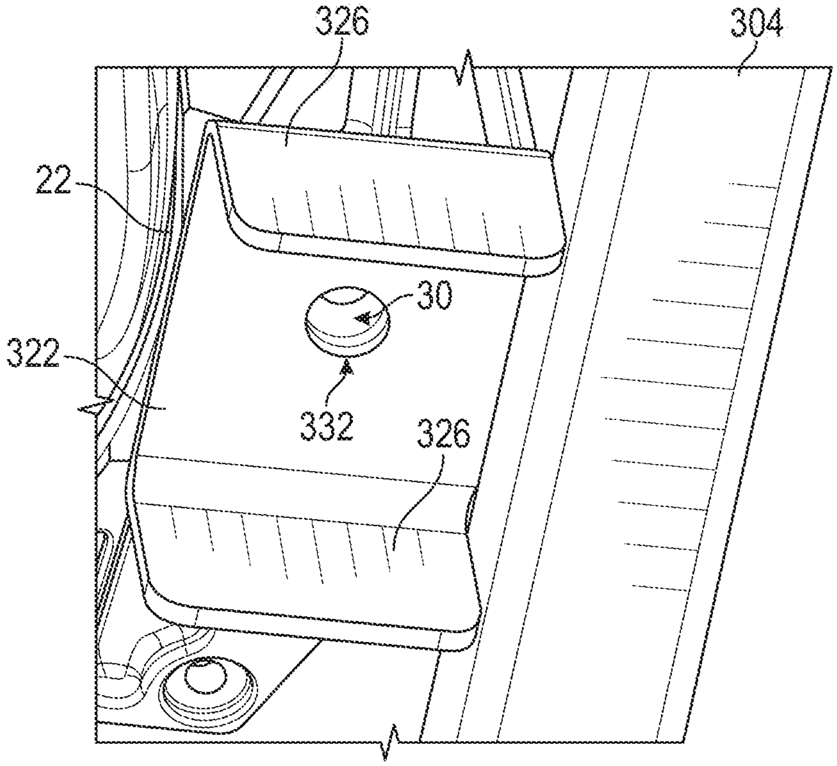
FIGS. 16-21 are various views of the cradle assembly of FIG. 15 coupled to an engine assembly.
Figure 17:
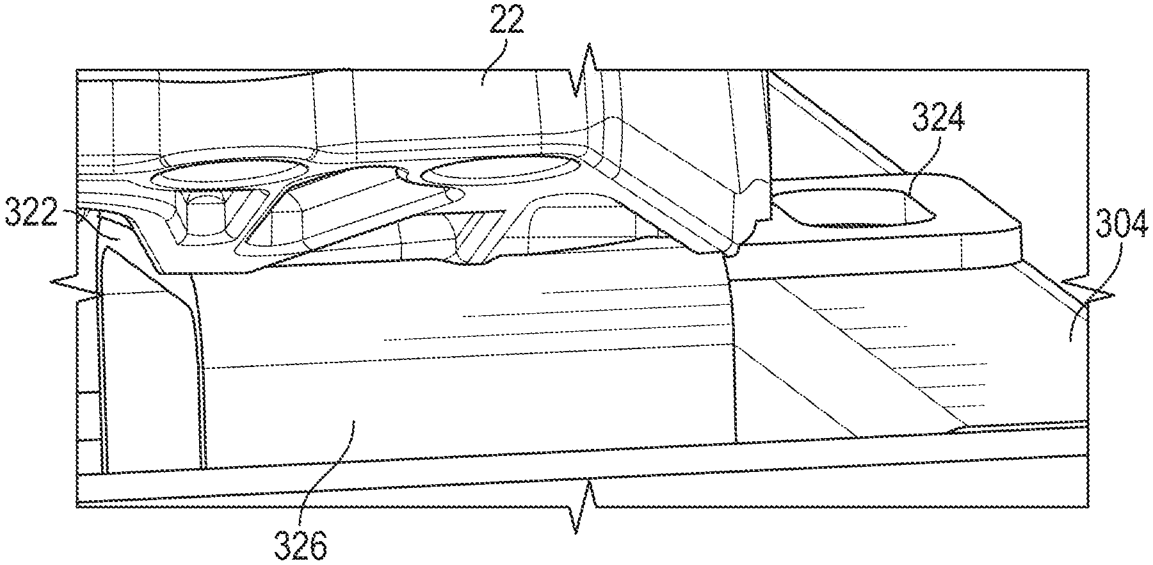
Figure 18:
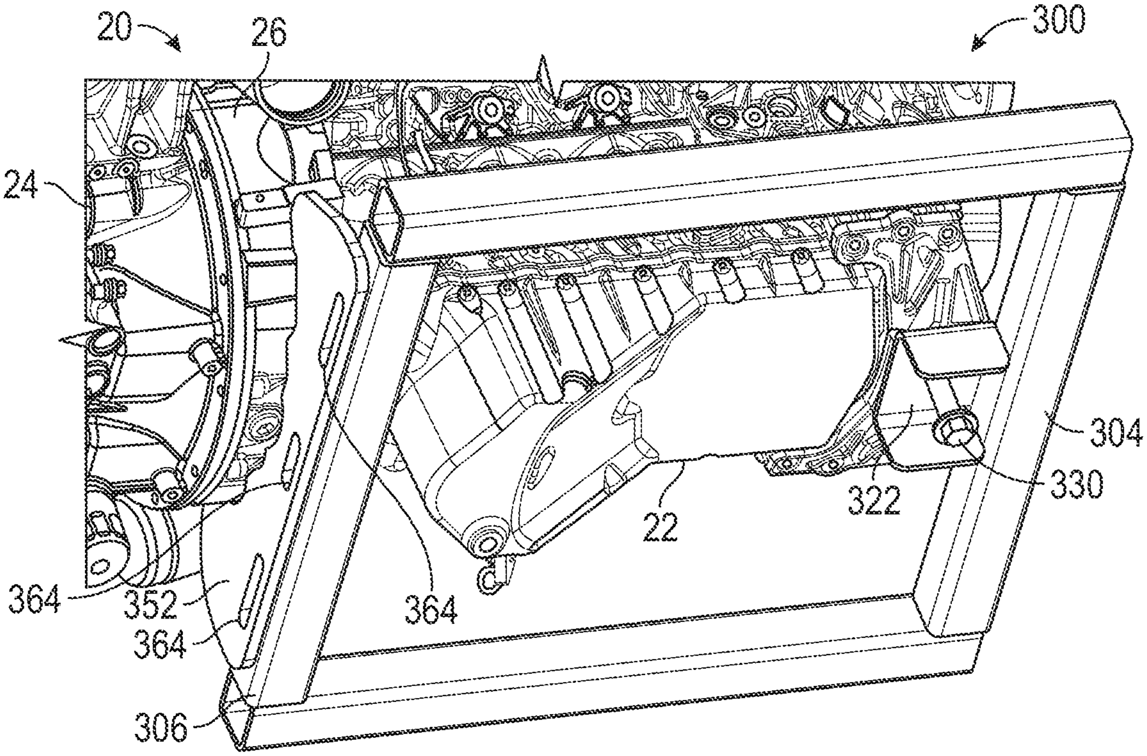
Figure 19:
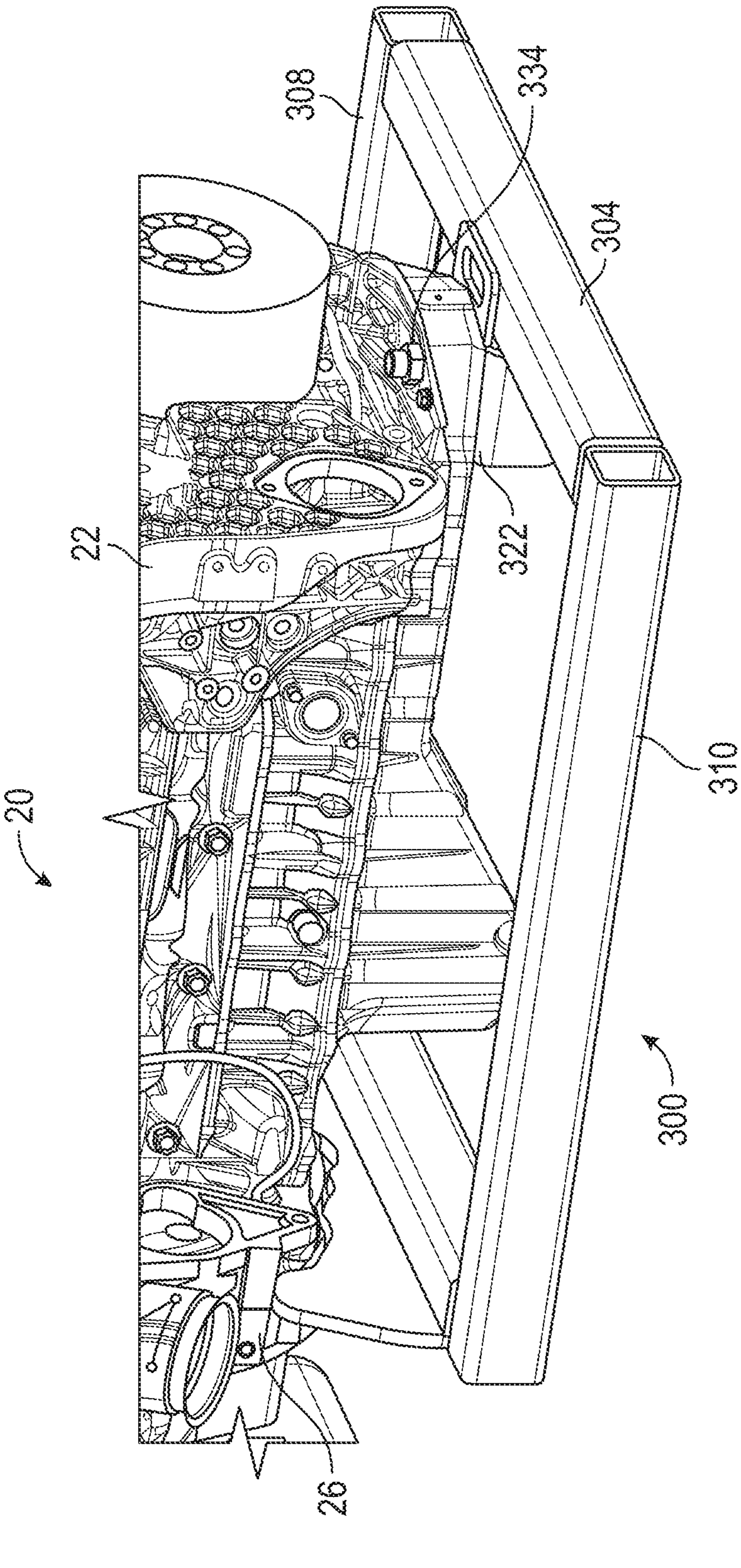

Referring to FIGS. 13 and 14, the dolly 400 includes a lower frame assembly 402. The lower frame assembly 402 includes a pair of laterally-extending frame members 404 extending between and fixedly coupled to a pair of longitudinally-extending frame members 406. The lower frame assembly 202 further includes a set of vertically-extending frame members 408. The frame members 408 are each arranged adjacent and fixedly coupled to one of the frame members 404 and one of the frame members 406. A caster 410 is rotatably coupled to the frame members 406 near each of the corners of the lower frame assembly 402. As shown, the dolly 400 does not include a receiving channel. In some embodiments, the frame members 408 are directly fixedly coupled to the cradle assembly 300. In other embodiments, the cradle assembly 300 is selectively removable from the dolly 400. By way of example, the cradle assembly 300 may rest on a protrusion extending from one or more of the frame members 408. By way of another example, the cradle assembly 300 may include one or more protrusions configured rest on one or more of the frame members 408.

In operation, the engine stand 10 or the engine stand 12 may be used to remove an engine assembly 20 from a vehicle and transport the engine assembly 20 to another location. Although the operation of the engine stand 10 is described hereinafter, it should be understood that a similar method of operation also applies to the engine stand 12. The vehicle containing the engine assembly 20 may be lifted off of the ground to facilitate access to the engine assembly 20. In one example, the engine assembly 20 is supported by a lift device (e.g., an engine hoist, an overhead crane, etc.). After disconnecting the engine assembly 20 from the rest of the vehicle, the lift device may be used to raise the engine assembly 20 out of the vehicle or drop the engine assembly 20 out of the vehicle, depending on the configuration of the vehicle. The lift device may then be used to set the engine assembly 20 onto the engine stand 10. Alternatively, the engine assembly 20 may be disconnected from the vehicle while the engine assembly 20 rests on the engine stand 10, and the vehicle may be lifted up and away from the engine assembly 20. Further alternatively, the cradle assembly 100 may be attached to the engine assembly 20 while the engine assembly 20 is still attached to the vehicle, and the cradle assembly 100 may be used to support the engine assembly 20 during removal from the vehicle.

To couple the cradle assembly 100 to the engine assembly 20, the engine assembly 20 should first be approximately aligned with the cradle assembly 100. The engine assembly 20 may then be moved toward the cradle assembly 100 while ensuring that the aperture 30 is aligned with the stud 130 or the aperture 332. An external surface of the engine assembly 20 (e.g., the exterior surface 156 of the bell housing 26) then contacts an angled surface of one of the rests 152, which automatically centers the engine assembly 20 laterally with the cradle assembly 100. The engine assembly 20 may be rotated or moved longitudinally to align with the stud 130 until the stud 130 enters the aperture 30. Alternatively, in embodiments which utilize the fastener 330, the engine assembly 20 may be lowered until the engine 22 contacts the bracket 322, and the position of the engine assembly 20 may be adjusted until the aperture 30 aligns with the aperture 332, facilitating entry of the fastener 330 into both the aperture 30 and the aperture 332. The nut 334 may then be tightened to secure the engine assembly 20 to the cradle assembly 100. Once the engine assembly 20 contacts the bracket 122 and the rests 152 or the bracket 322 and the rests 352, the engine assembly 20 is supported by the cradle assembly 100. This process is faster and easier than the process used by conventional engine stands where multiple fasteners have to be aligned and tightened prior to the engine stand supporting an engine assembly.

While the cradle assembly 100 is coupled to the dolly 200, the casters 210 of the dolly 200 facilitate movement of the engine assembly 20 to another location (e.g., a work area remote from the vehicle, etc.). The cradle assembly 100 and the engine assembly 20 may then be removed from the dolly 200 placed elsewhere. The cradle assembly 100 may be removed from the dolly 200 by lifting vertically upwards (e.g., using a forklift having forks extending into the apertures 114 of the third frame member 108 and the fourth frame member 110, etc.). The cradle assembly 100 may be set directly onto the ground or onto another support surface. By way of example, the cradle assembly 100 may be configured to be supported by a number of jack stands engaging the upper frame assembly 102 and/or the engine assembly 20. The dolly 200 may then be used to manipulate a second cradle assembly 100 and a second engine assembly 200 while a maintenance procedure is performed on the first engine assembly 20. Accordingly, one dolly 200 may easily be shared amongst multiple operators.

Referring to FIGS. 22-30, an engine stand 500 is shown according to another exemplary embodiment. The engine stand 500 is configured to support the engine assembly 20 for transportation and storage. Then engine stand 500 includes a frame assembly, shown as frame 502. The engine stand 500 further includes a set of rolling elements or wheels, shown as casters 504, that facilitate movement of the engine stand 500 across the ground.

Figure 26:
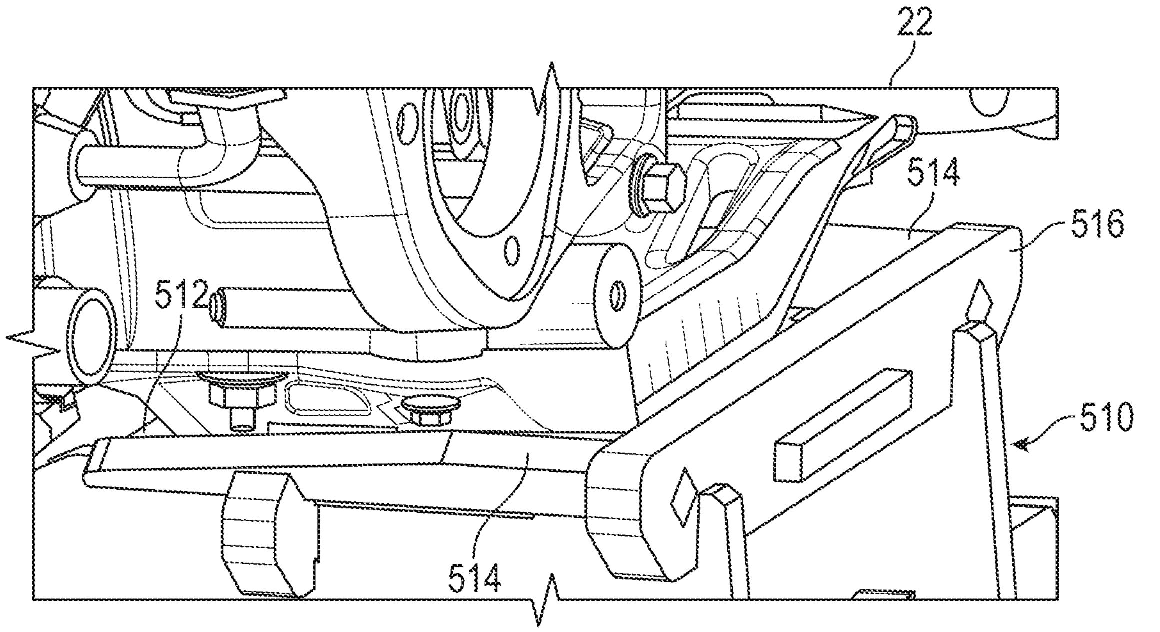

Referring to FIG. 26, the engine stand 500 further includes a support assembly, shown as tray 510, fixedly coupled to the frame 502. The tray 510 includes a flat baseplate 512, a pair of angled sidewalls 514, and a front wall 516. The angled sidewalls 514 are fixedly coupled to opposing lateral sides of the flat baseplate 512 and are angled inward. The front wall 516 is fixedly coupled to a front side of the flat baseplate 512 and extends vertically upward from the flat baseplate 512. As shown FIG. 22, the tray 510 receives a front end of the engine assembly 20. The engine 22 rests on the flat baseplate 512 and is prevented from moving forward or laterally by the angled sidewalls 514 and the front wall 516.

Figure 27:
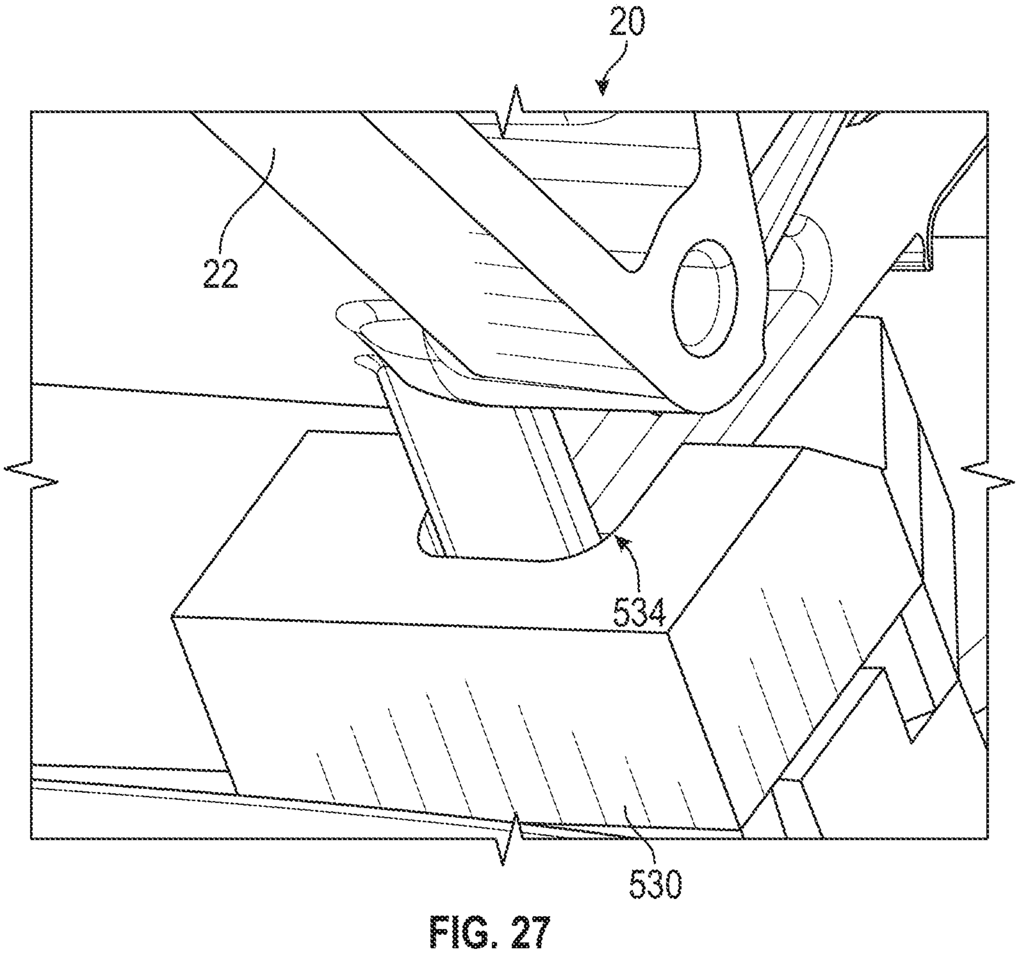
Figure 28:
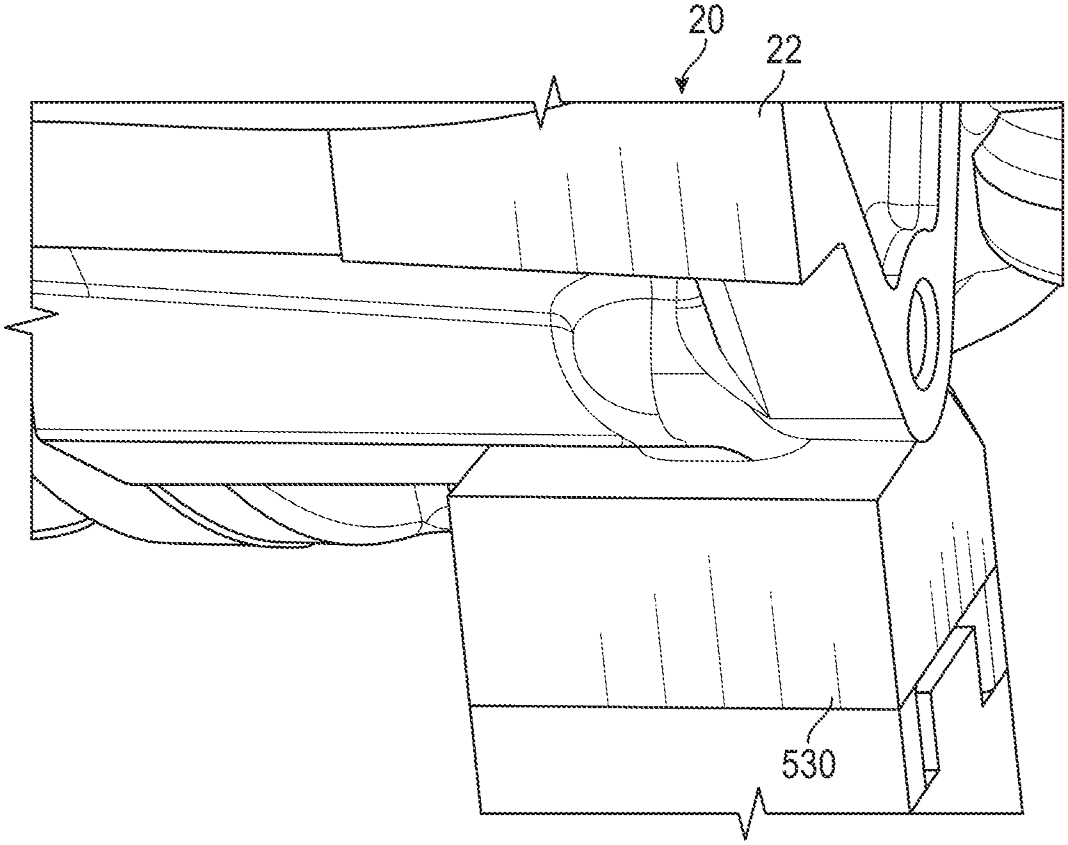
Figure 29:
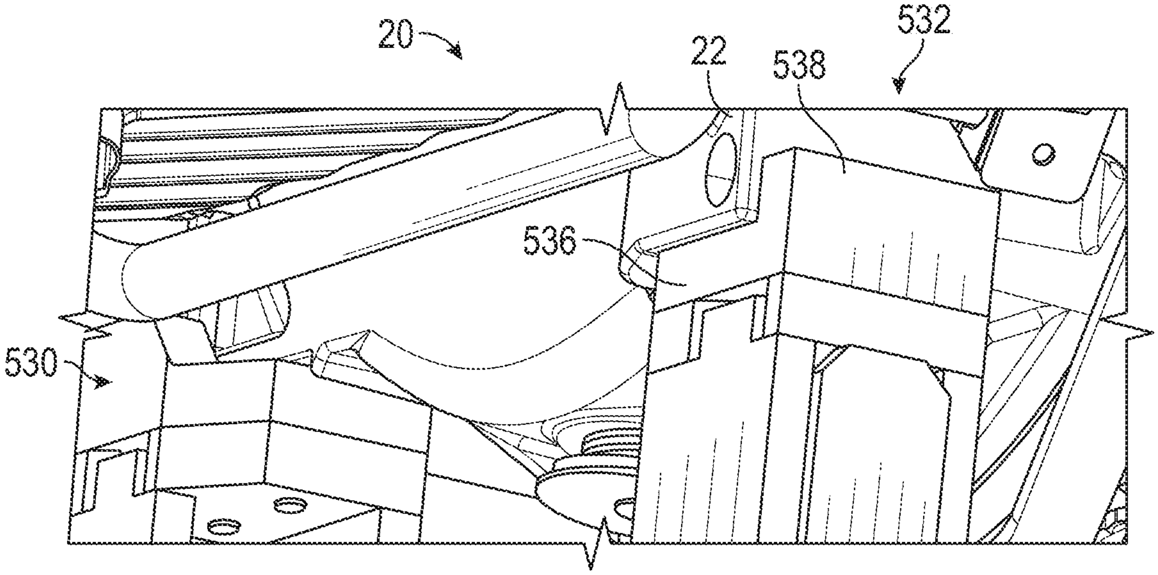

Referring to FIGS. 27-29, the engine stand 500 further includes a first receiver, shown as locking receiver 530, and a second receiver, shown as bracing receiver 532, each fixedly coupled to the frame 502. The locking receiver 530 and the bracing receiver 532 are located rearward of the tray 510. The locking receiver 530 defines a groove 534 that opens upwardly and towards the bracing receiver 532. The bracing receiver 532 includes a plate 536 extending substantially horizontally and a wall 538 extending upward from the plate 536. The wall 538 extends upward from the side of the plate 536 located opposite the locking receiver 530. The locking receiver 530 and the bracing receiver 532 receive a rear end of the engine 22. The engine 22 extends into the groove 534, preventing the engine 22 from moving longitudinally, downward, or in a first lateral direction. The engine 22 rests atop the plate 536 and adjacent the wall 538, preventing the engine 22 from moving downward or in a second lateral direction opposite the first lateral direction.

Figure 30:
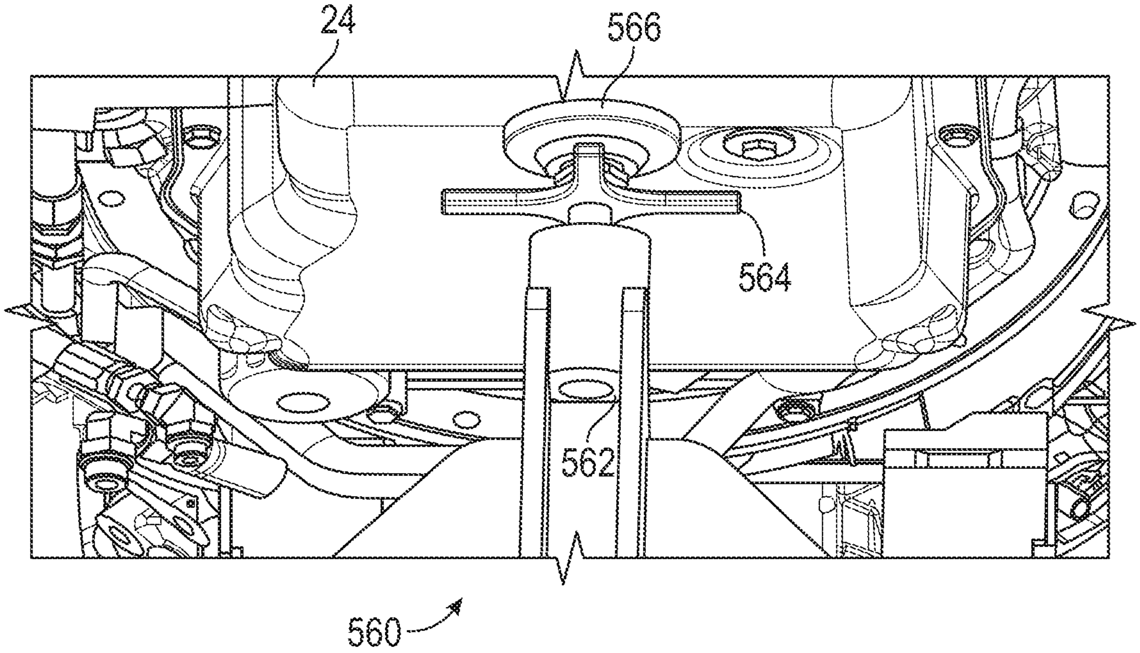

Referring to FIG. 30, the engine stand 500 further includes an assembly, shown as jack assembly 560, coupled to the frame 502. The jack assembly 560 is located rearward of the locking receiver 530 and the bracing receiver 532. The jack assembly 560 includes a fixed base element, shown as base 562, a rotating element, shown as handle 564, and an interface element, shown as pad 566. The base 562 is fixedly coupled to the frame 502. The handle 564 is rotatably and translatably coupled to the base 562 (e.g., with a threaded connection) such that a rotation of the handle 564 causes a corresponding vertical movement of the handle 564. The pad 566 is coupled to the handle 564 such that the pad 566 moves vertically with the handle 564. The jack assembly 560 is configured to support the transmission 24. The handle 564 is rotated to adjust the position of the pad 566 until the pad 566 comes into contact with the transmission 24. The position of the pad 566 may then be further adjusted until the pad 566 reaches a desired height or supports a desired portion of the weight of the transmission 24.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. An engine stand, comprising:

a cradle assembly configured to support an engine assembly, comprising:

an upper frame assembly comprising:

a first lateral frame member and a second lateral frame member;

a first longitudinal frame member and a second longitudinal frame member extending from the first lateral frame member to the second lateral frame member and fixedly and unmovably coupled to the first lateral frame member and the second lateral frame member;

a cylindrical pin coupled to the first lateral frame member so that the cylindrical pin is offset from a top surface of the first lateral frame member in a direction toward the second lateral frame member, wherein the cylindrical pin is configured to be received by an aperture defined by the engine assembly; and a rest coupled to the second lateral frame member, the rest having an engagement surface positioned to contact the engine assembly when the cradle assembly supports the engine assembly, wherein an entirety of the rest is positioned laterally inwardly from an outer lateral edge of both of the first longitudinal frame member and the second longitudinal frame member, and wherein a portion of the engagement surface is angled relative to a horizontal plane defined by the first lateral frame member and the second lateral frame member; and a dolly coupled to the cradle assembly, comprising:

a lower frame assembly, the lower frame assembly comprising a set of horizontal frame members longitudinally offset from one another and extending between a pair of longitudinally extending frame members;

a pair of first receiving channels coupled to the lower frame assembly and positioned to receive the first lateral frame member, wherein the cylindrical pin is positioned between the first receiving channels when the first receiving channels receive the first lateral frame member;

a pair of second receiving channels coupled to the lower frame assembly and positioned to receive the second lateral frame member, and wherein the rest is positioned between the second receiving channels when the second receiving channels receive the second lateral frame member; and a plurality of wheels rotatably coupled to the lower frame assembly and configured to support the lower frame assembly;

wherein the set of horizontal frame members are fixedly coupled to a pair of vertically extending frame members, and wherein the first lateral frame member includes a coextensive portion that is at least partially coextensively provided above the first longitudinal frame member, and the second lateral frame member includes a coextensive portion that is at least partially coextensively provided above the second longitudinal frame member, wherein the coextensive portions of the first lateral frame member and the second lateral frame member are parallel to one another.

2. The engine stand of claim 1, wherein the cylindrical pin comprises a threaded portion configured to facilitate a connection to a nut.

3. The engine stand of claim 1, wherein the cradle assembly further comprises one or more spacers configured to engage a support surface when the cradle assembly is set directly on the support surface.

4. The engine stand of claim 1, wherein the upper frame assembly includes a bracket directly fixedly coupled to the cylindrical pin and to the first lateral frame member.

5. The engine stand of claim 4, wherein the rest is directly coupled to the second lateral frame member.

6. The engine stand of claim 5, wherein first receiving channels and the second receiving channels are positioned between the first longitudinal frame member and the second longitudinal frame member of the upper frame assembly.

7. The engine stand of claim 1, wherein the cylindrical pin is positioned between the first longitudinal frame member and the second longitudinal frame member of the upper frame assembly.

8. An engine stand, comprising:

a cradle, comprising:

an upper frame assembly including a pair of first tubular members extending between and fixedly and unmovably coupled to a pair of second tubular members, wherein each of the first tubular members and the second tubular members define a passage extending through an entire length of the corresponding first tubular member or the corresponding second tubular member, and wherein each of the first tubular members and the second tubular members defines a rectangular cross section;

a pin coupled to the upper frame assembly and extending upward from the upper frame assembly so that the pin is offset from a top surface of one of the first tubular members in a direction toward another one of the first tubular members;

a rest coupled to the upper frame assembly and extending upward from the upper frame assembly, wherein an entirety of the rest is positioned laterally inwardly from an outer lateral edge of both of the second tubular members; and a dolly coupled to the cradle, the dolly comprising:

a pair of receivers each defining a channel configured to receive the upper frame assembly to removably couple the upper frame assembly to the dolly; and a plurality of wheels rotatably coupled to the dolly;

wherein the pair of first tubular members each include a coextensive portion that is at least partially coextensively provided above a portion of a respective one of the pair of second tubular members, wherein the coextensive portions of the pair of first tubular members are parallel to one another.

9. The engine stand of claim 8, wherein each of the receivers engages one of the first tubular members when the cradle is coupled to the dolly.

10. The engine stand of claim 8, wherein one of the receivers engages one of the first tubular members to couple the cradle to the dolly, wherein the cradle further comprises a bracket directly coupled to the pin and to the one of the first tubular members.

11. The engine stand of claim 10, wherein the one of the receivers engages the one of the first tubular members at a position between the second tubular members.

12. The engine stand of claim 8, wherein one of the receivers engages the one of the first tubular members to couple the cradle to the dolly, and wherein the rest is directly coupled to the one of the first tubular members.

13. The engine stand of claim 12, wherein the one of the receivers engages the one of the first tubular members at a position between the second tubular members.

14. The engine stand of claim 13, wherein the rest is positioned between the second tubular members.

15. The engine stand of claim 8, wherein the rest and the pin are positioned between the second tubular members.

16. The engine stand of claim 8, wherein the plurality of wheels are configured to engage a support surface to facilitate movement of the dolly and the cradle along the support surface.

* * * * *